United States Patent [19]

Higgins et al.

[11] Patent Number: 5,835,627
[45] Date of Patent: *Nov. 10, 1998

[54] SYSTEM AND METHOD FOR AUTOMATICALLY OPTIMIZING IMAGE QUALITY AND PROCESSING TIME

[76] Inventors: Eric W. Higgins, 153 Concord St., #35, Newton Lower Falls, Mass. 02162; Bror O. Hultgren, III, 6 Jeffrey's Neck Rd., Ipswich, Mass. 01938; F. Richard Cottrell, 49 Kennedy Cir., South Eaton, Mass. 02375

[*] Notice: The term of this patent shall not extend beyond the expiration date of Pat. No. 5,694,484.

[21] Appl. No.: 859,665

[22] Filed: May 20, 1997

Related U.S. Application Data

[63] Continuation-in-part of Ser. No. 440,647, May 15, 1995, Pat. No. 5,694,484.

[51] Int. Cl.⁶ .................................................. G06K 9/46
[52] U.S. Cl. ............................................................ 382/167
[58] Field of Search .......................... 382/100, 112–113, 382/128, 130–132, 141, 254–255, 307, 309, 311, 276; 358/448–467, 452–453, 400, 474, 487, 504, 508, 518, 520–522, 527, 530, 534

[56] References Cited

U.S. PATENT DOCUMENTS

| | | | |
|---|---|---|---|
| 4,459,613 | 7/1984 | Farpiouoja | 358/167 |
| 4,831,434 | 5/1989 | Fuchsberger | 358/80 |
| 4,969,040 | 11/1990 | Gharavi | 358/136 |
| 5,048,095 | 9/1991 | Bhanu et al. | 382/9 |
| 5,181,259 | 1/1993 | Rorvig | 382/36 |
| 5,218,434 | 6/1993 | Vinck | 358/80 |
| 5,694,484 | 12/1997 | Cottrell et al. | 382/167 |

FOREIGN PATENT DOCUMENTS

| | | | |
|---|---|---|---|
| 0414415A2 | 2/1991 | European Pat. Off. | G06F 15/72 |
| 0428790A1 | 5/1991 | European Pat. Off. | H04N 1/46 |
| 473414A3 | 3/1992 | European Pat. Off. | G06F 15/72 |
| 0583055 A2 | 2/1994 | European Pat. Off. | G06F 15/68 |
| 61-208577 | 9/1986 | Japan | G06F 15/66 |
| 61-251966 | 11/1986 | Japan | G06F 15/62 |
| 63-303471 | 12/1988 | Japan | G06F 15/62 |
| 2292681 | 12/1990 | Japan | G06F 15/66 |

*Primary Examiner*—Jose L. Couso
*Attorney, Agent, or Firm*—Donald F. Mofford; Barry Gaiman

[57] ABSTRACT

An image processing system and method for processing an input image provides a virtual observer for automatically selecting, ordering and implementing a sequence of image processing operations which will yield maximum customer satisfaction as measured by a customer satisfaction index (CSI) which, for example, can balance the image quality and the processing time. The CSI evaluates an effect of the sequence of image processing operations on the input image in response to upstream device characteristic data received from an input device profile, downstream device characteristic data received from an output device profile, host configuration data, user selection data, trial parameter values and data corresponding to the sequence of image processing operations. In a preferred embodiment, the effect is evaluated in accordance with predetermined psychovisual attributes of the input image as attained and codified by human observers who have subjectively selected a most pleasing test image corresponding to objective metrics of the predetermined psychovisual attributes.

14 Claims, 15 Drawing Sheets

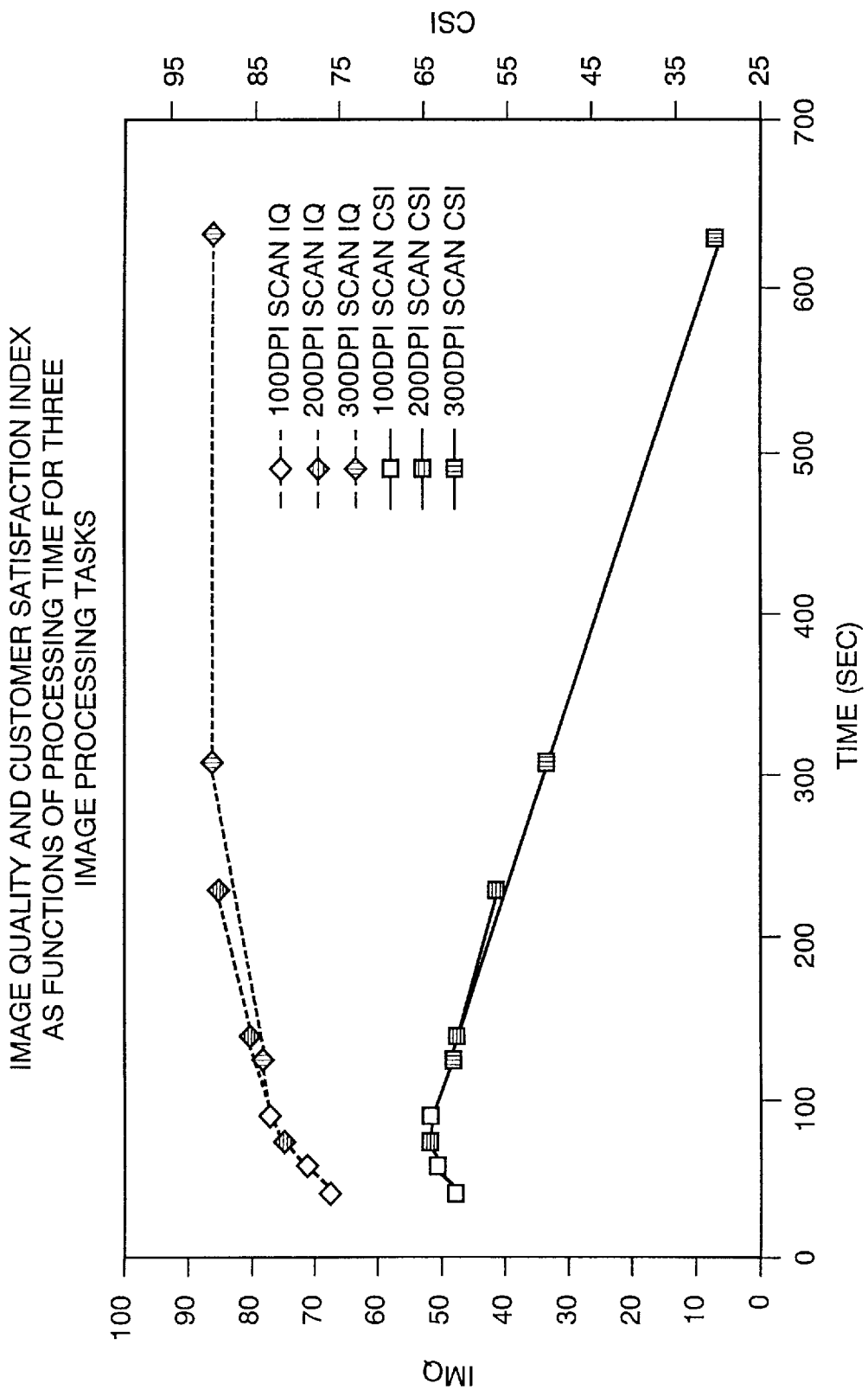

SYSTEM AND METHOD FOR AUTOMATICALLY OPTIMIZING IMAGE QUALITY AND PROCESSING TIME

This application is a continuation-in-part of U.S. patent application Ser. No. 08/440,647 filed May 15, 1995 now U.S. Pat. No. 8,694,484, by Cottrell and Hultgren.

FIELD OF THE INVENTION

The invention relates generally to the field of image processing and more particularly to a system and method whereby customer satisfaction is automatically optimized by balancing (i) processing time for a selected group of operations, and (ii) image quality as represented by predetermined psychovisual attributes.

BACKGROUND OF THE INVENTION

In the past, processing of, for example, photographic images often required use of complex and expensive optical systems, including a myriad of optical lenses and other elements, which enabled an operator to produce a number of special effects, and perform compositing and other operations. The integrity of such processing is clearly a function of the quality of the optical systems as well as the degree to which they are maintained over their lifetimes. Since these optical systems are clearly analog, it may be difficult to ensure that, for example, processing performed on one system can be accurately reproduced on other systems.

More recently, computers and digital logic circuitry have become faster to make digital processing of images feasible. Digital systems are generally less expensive than high-quality analog systems, and require much less maintenance. In addition, different copies of the same digital system should, when processing the same data in accordance with the same series of operations, produce precisely the same results. Digital systems not only allow the special effects, compositing and other operations that were possible using the prior analog systems, but they also allow other operations which can help to optimize the appearance of the images, including, for example, reduction of noise and sharpening of the images. Specific image-enhancement operations are applied, for use with specific devices used to record, or "acquire," the images, as well as specific destination devices used to print or otherwise "render" the processed images to a downstream device or application. The order in which these and other operations are applied is another consideration. However, in view of the myriad types of devices each represented by a device profile, as well as the myriad types of image-enhancement and other operations which an operator may wish to apply to an image, it is generally difficult to predict a priori the degree to which the image-enhancement operations should be applied to achieve an optimal image output by the rendering device.

Digital image processing conventionally involves certain operator interactions pertaining to adjusting image characteristics such as size, color, sharpness, tone scale, luminance and graininess. Image resolution is an important variable in digital imaging today, as is evident from the fact that file formats exist which can store an image in multiple resolutions. Several currently available digital cameras allow images to be stored at various resolutions. Additionally, digital imaging resizing algorithms are well known; and could be used to change the resolution of a previously acquired image before subsequent processing. Also, it is common to adjust the resolution of an image when scanning a reflective or transparent original.

In a conventional digital image processing system, an operator views an input image on a computer monitor and selects desired processing operations which are available from the applications software running on his workstation. In viewing the monitor, the operator subjectively decides what needs to be changed to improve the image by way of, for example, a pull-down menu. The amount of sharpening needed is estimated and the sharpening step is repeated until the operator is satisfied with the sharpness of the image. The number of iterations for a given process is directly related to operator experience. Oftentimes, the tweaking of one image characteristic (such as sharpness) will be compromised by adjustments to a second image characteristic (such as luminance). In these cases, the operator continues through trial and error to improve the image displayed on the monitor until he is satisfied with the adjustments. Of course, the look of the final adjusted image is dependent upon the operator's subjectivity. Clearly, the conventional interactive correction process described above requires experience to be done well. It is operator subjective, time consuming and frustrating.

One consideration in processing an image is the time required to complete a particular sequence of image processing operations. As an example, an operator may find that noise reduction consumes 30 seconds of processing time, sharpening consumes 15 seconds of processing time, and color enhancement consumes 7 seconds of processing time. The operator then determines the degree of improvement of the original image subject to each of the processing routines, and what degree of improvement is required for his particular needs. He will decide whether the improvement in the rendered image is worth the 30 second wait. If top image quality is required at any cost, and if the above three processing operations will give him the image quality he needs, then he may be willing to endure 52 seconds of computational processing time. However, if the rendered image is acceptable for his purposes with only color enhancement, then he may not be willing to wait more than the 7 seconds required for color enhancement processing.

Further to the above discussion, it is a primary object of the present invention to automate the selection of processing operations in a digital image processing system through the use of a predetermined customer satisfaction index (CSI) which balances processing time and customer perceived image quality and minimizes the need for operator interaction. Other objects will become apparent in view of the following description, drawings and claims.

SUMMARY OF THE INVENTION

An image processing system and method for processing an input image provides a virtual observer for automatically selecting, ordering and implementing a sequence of image processing operations which will yield maximum customer satisfaction as measured by a customer satisfaction index (CSI) which, for example, can balance the image quality and the processing time. The CSI evaluates an effect of the sequence of image processing operations on the input image in response to upstream device characteristic data received from an input device profile, downstream device characteristic data received from an output device profile, host configuration data, user selection data, trial parameter values and data corresponding to the sequence of image processing operations. In a preferred embodiment, the effect is evaluated in accordance with predetermined psychovisual attributes of the input image as attained and codified by human observers who have subjectively selected a most pleasing test image corresponding to objective metrics of the predetermined psychovisual attributes.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 15 is a graphical representation comparing image quality versus processing time to a customer satisfaction index.

DETAILED DESCRIPTION OF THE PREFERRED EMBODIMENTS

I. Terminology

Figure 1:
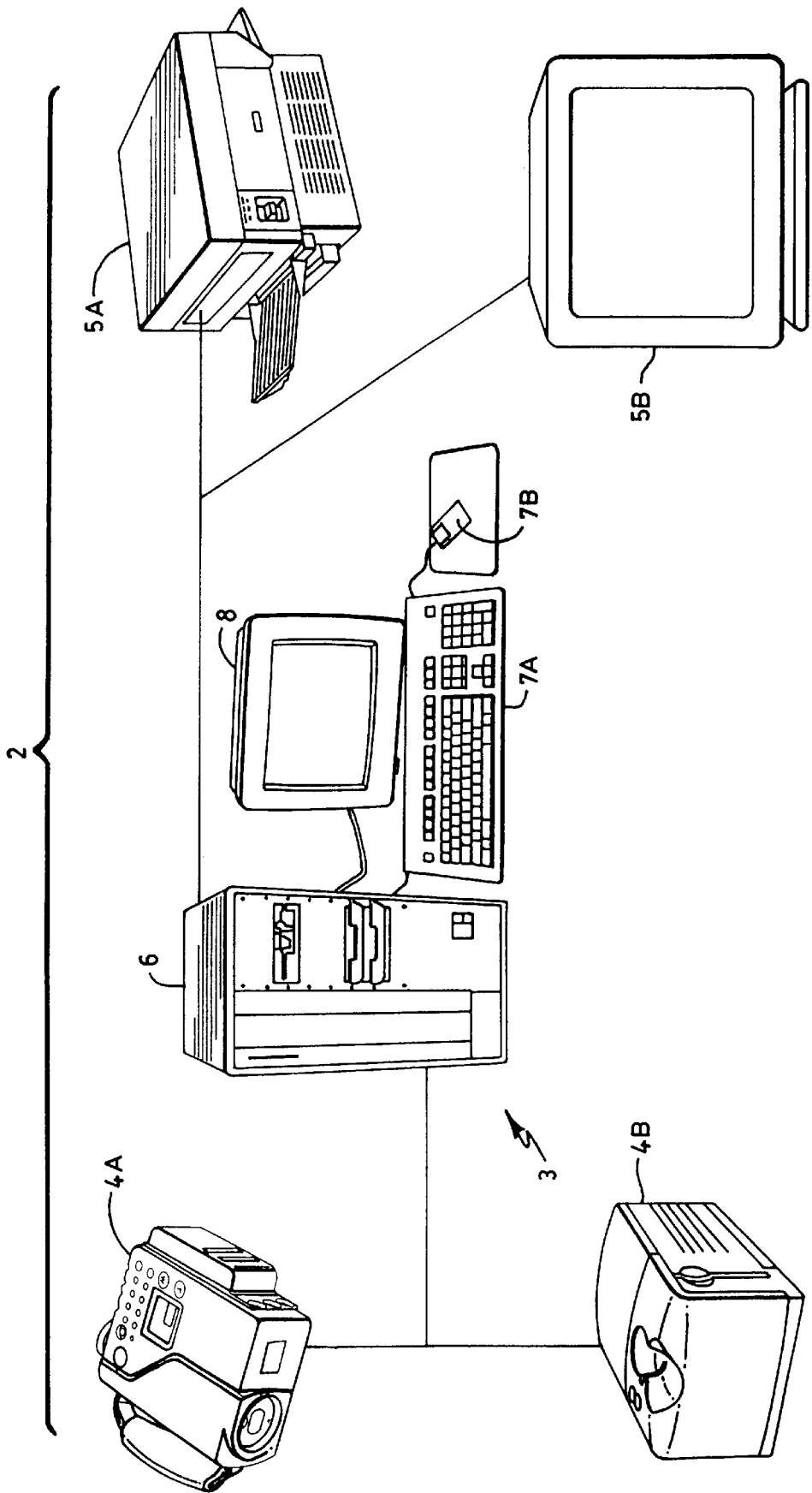
FIG. 1 is a pictorial diagram of a configuration of an image acquisition and rendering system including an image processing system constructed in accordance with the principles of the invention.

The use of consistent terminology throughout this application is provided in keeping with both industry standards and the nomenclature of the parent application.

As well known in the industry and defined by the International Color Consortium on page 102 of the ICC Profile Format Specification, Version 3.3, Nov. 11, 1996, a device profile is a digital representation of the relation between device coordinates and a device-independent specification of color. This definition is expanded to include data for describing a device dependent transformation of spatial information content of an image (see U.S. patent application Ser. No. 08/709,487 filed Sep. 6, 1996 of common assignee and incorporated herein by reference for background information). Device profiles, which vary for different input and output devices, as well as for intermediary display devices, are typically generated during calibration of the individual devices in a factory or laboratory setting.

Source characteristic information is device profile data which represents selected chromatic and spatial characteristics of a particular image data source or input device.

Downstream utilization element characteristic information is device profile data which represents selected chromatic and spatial characteristics of a particular downstream utilization element. A downstream utilization element is broadly defined as any destination device or application.

The user selection information, also referred to as image processing operation selection information, is selected by an operator who can select: a tradeoff between processing time and image quality; the size of the image to be rendered; and specific source and destination devices for use with the system. Of course, the extent of operator selected options can be varied to include other functions as well.

A psychovisual attribute of an image is an image quality attribute (such as brightness, sharpness, color, etc.) which can be subjectively judged by a person, whereby his subjective judgment can be correlated with some objective metric or image quality function value, such as a numerical rating system. The psychovisual attributes are predetermined during psychovisual testing and are not adjustable by the user.

Processing operation parameter information is data, for use in processing section 20, which has been generated in the characteristic processing section in response to the user selection information, the source characteristic information, the downstream utilization element characteristic information and predetermined psychovisual attributes.

Processing time can broadly be defined as the time required to complete any particular image processing operation. However unless otherwise noted in this application, the processing time in relation to customer satisfaction is defined as the time which an operator must wait for an image to be rendered. For example, rendering to a destination device could be defined as the time between the operator initiation of an action and the completion of rendering the processed image, or it could be defined as the time between operator initiation and rendering the processed image to the destination device. Of course, the processed image could be rendered to a printer, a memory, a software program or any other destination device or application.

The customer satisfaction index, also referred to as CSI, is a numerical value representing the preferred tradeoff of a system operator between two parameters such as, but not limited to, image quality and processing time. In the following description, the preferred embodiment uses CSI with an image processing system and method based upon psychovisual optimization. However, the concept of using a CSI may be broadly applied to any image processing system, whether that system uses psychovisually gathered data or not.

II. The Use of Psychovisual Attributes by the Image Processing Platform

Problems of operator subjectivity and required user interaction can be overcome by the use of a computer, or a part thereof, as a virtual observer which generates psychovisually optimized image data by automatic adjustment (i.e. without the need of human interaction) according to given psychovisual attributes (such as sharpness) of image quality. A psychovisual attribute is measurable through psychovisual testing by known methods such as category scaling or paired comparison. These methods allow a numerical value to be associated with an image which represents the average image quality as judged by a group of observers.

The group of observers is not limited to photographic experts such as people trained in image science. In fact, a given human observer may select the "best" image to have a sharpness level which differs from the optimum sharpness level of the image as determined by a photographic expert.

Hence, in order to represent the broadest popular appeal of an image, the group of observers is typically selected from a diverse group of people representing a cross section of our society. Of course, if desired, the selected group of human observers could be specialized, such as all children or all real estate brokers whereby the average observer would represent an average child or an average real estate broker, respectively.

In psychovisual testing, a group of human observers is presented with a group of images of a scene that differ from one another by one or more objectively measurable psychovisual image attribute, such as sharpness. The group of average human observers views each image and then rates each image on a scale from 1 to 10, 1 meaning very poor image quality and 10 meaning very high image quality. In this case the only distinction between images is the sharpness level, so the observers are effectively selecting or ordering the images according to sharpness preferences. However, if desired, a combination of psychovisual attributes could be chosen so that an image would be simultaneously psychovisually tested in terms of, say, sharpness, color rendition, and graininess.

A statistical analysis of the results of the psychovisual tests yields one preferred image selected from the group of images, i.e. an image having optimal psychovisual appearance. The images may also be ordered according to preference. The preferred image having optimal psychovisual appearance is deemed to be the most aesthetically pleasing image in terms of sharpness for the current example. Thus, by reconstructing an image of the scene to have the same sharpness level as the preferred image, the reconstructed image of the scene is said to be psychovisually optimized in terms of the psychovisual attribute, sharpness.

Image quality is principally defined by four image parameters or characteristics: image sharpness, graininess, tonal rendition and color rendition. This is not meant to be a limiting definition in that size, borders, surface gloss, and scene content also play a role. The four principal image parameters can be quantified by objective metrics and measured in the laboratory. For example, the sharpness of an imaging device may be characterized by its modulation transfer function, the granularity by its Wiener spectrum, and its tonal reproduction by its characteristic curve.

It is most advantageous to select objective metrics that correlate with the human observation of the quality of the image. Thus, one can advantageously select a sharpness metric that "eye weights" the characterizing modulation transfer function sharpness data as described below. Many such metrics have been proposed that correlate with the subjectively defined image quality. One such metric, which will be described later, is a subjective quality value (SQV) also referred to as a subjective quality factor (SQF). Likewise one can characterize each of the four major image quality parameters with objective metrics measuring psychovisual attributes which correlate with image quality. One can calculate the overall system objective metric given the characteristic metrics of the input device, the output device and the image processing steps involved in the chain. Given the characterization of the four principal image parameters, which are each measurable by objective metrics, we then calculate the image quality expected for an image based on the previously defined correlations relating subjectively defined image quality to these objective metrics. Since the system as defined above contains an image processing chain having steps which are parametrically controlled, it is possible to search out an optimum set of parameters.

II. Image Quality Versus Processing Time

The customer satisfaction index, or CSI, is a numerical value representing a tradeoff between image quality and the processing time. For instance, a CSI may range from 0.0 to 1.0 where 1.0 represents maximum customer satisfaction in view of the above tradeoffs. Mathematically, the CSI may be represented in the form of a Minkowski metric, $$CSI=[(1/IM_q)^n-(1/Q_t)^n]^{-1/n} \quad (1)$$

where:

CSI=customer satisfaction index (the user is the customer);

$IM_q$=image quality perceived by the user;

$Q_t$=time quality perceived by the user;

t=processing time; and n=a predetermined constant.

Figure 11:
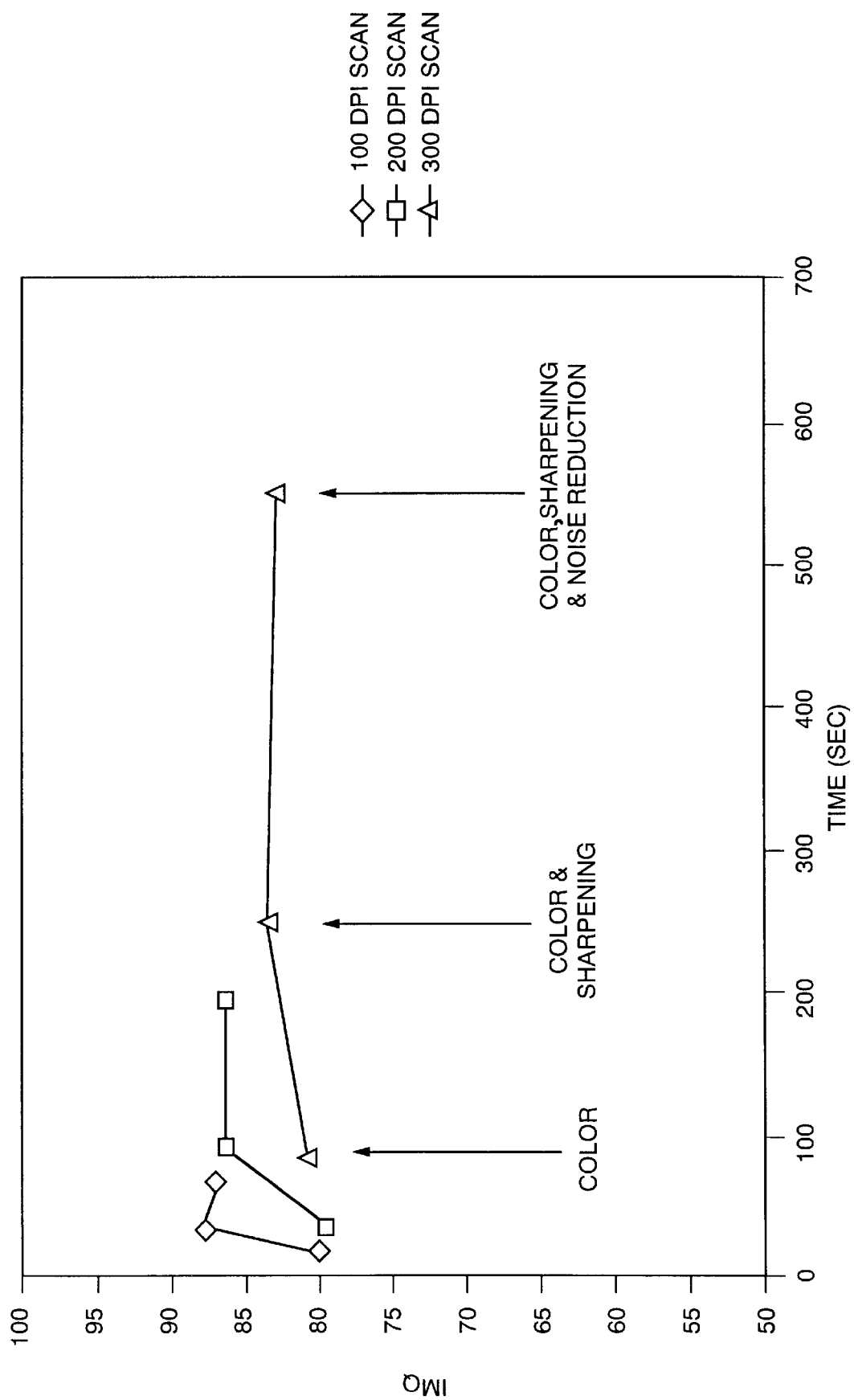
FIG. 11 is a graphical representation of image quality versus processing time for acquiring, processing and rendering a 2.5"×3.5" print at various dot resolutions.
Figure 12:
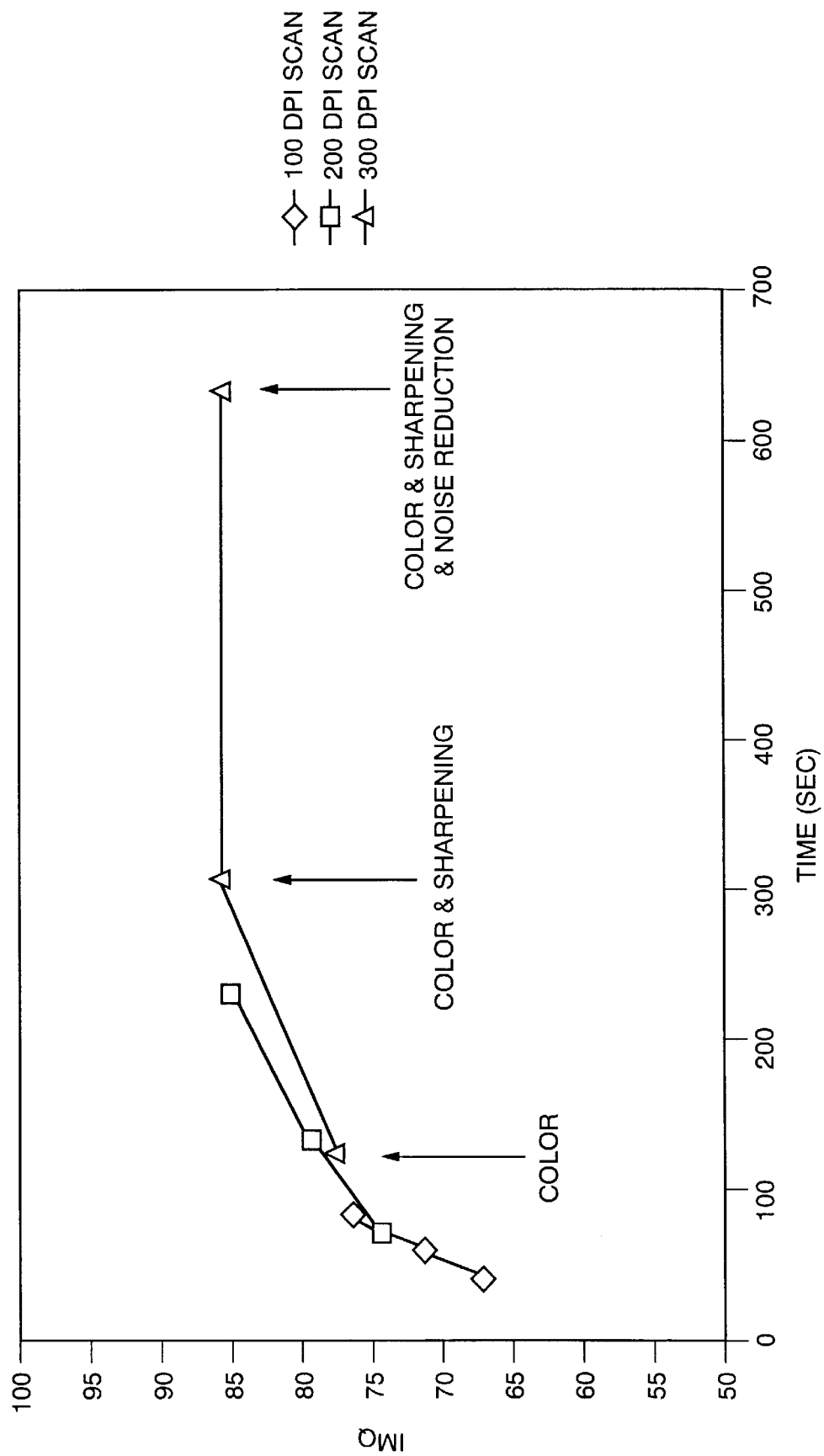
FIG. 12 is a graphical representation of image quality versus processing time for acquiring, processing and rendering a 5"×7" print at various dot resolutions.

In one empirical example, a source image was subjected to combinations of color mapping, sharpening and noise reduction at different resolutions. The task involved scanning a 5"×7" print to acquire a source image, processing the acquired image, then printing or rendering the processed image at 300 dpi on a thermal printer. FIG. 11 shows the results for rendering the image at a size of 2.5"×3.5", and FIG. 12 shows the results for rendering the same image at a size of 5"×7". Both figures track the results at different print resolutions, i.e. 100dpi, 200dpi, and 300dpi. The processing times on a Pentium 66 MHz programmable computer were measured and the perceived image quality $IM_q$ calculated through the use of objective metrics correlated to psychovisual testing. The results shown in FIGS. 11 and 12 show that it is quite easy to apply image processing steps and to employ image resolutions that do not add significant image quality advantages, but which do add significantly to the time required to process the image.

Figure 13:
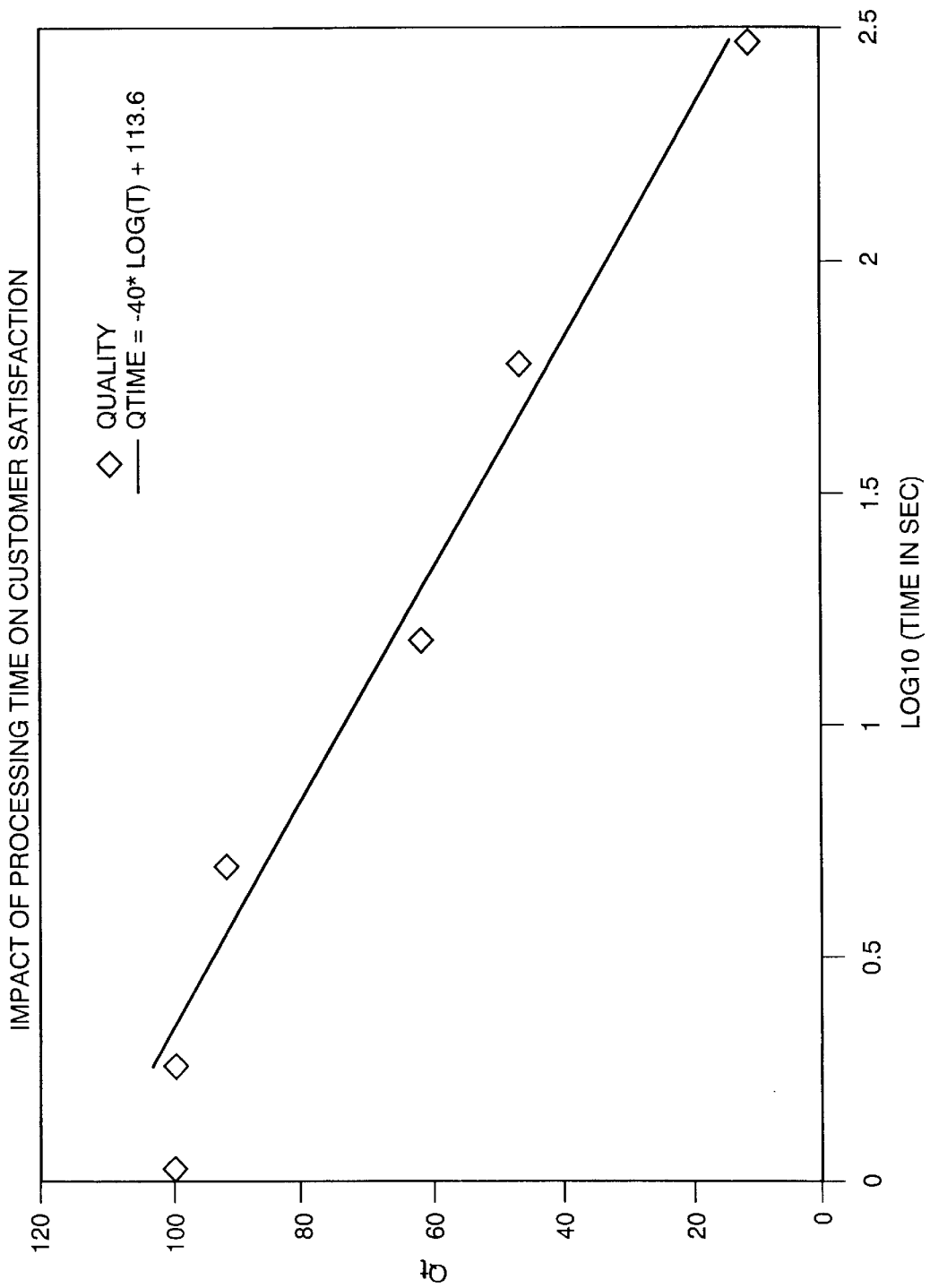
FIG. 13 is a graphical representation of perceived time quality versus processing time.

The impact of processing time t on customer satisfaction was empirically measured and plotted on the logarithmic time scale of FIG. 13. As the processing time t for an image increases, the perceived time quality $Q_t$, decreases. One specific example of the general form for expressing the perceived time quality $Q_t$=f(t) is $$Q_t=C_1 \log t+C_2 \quad (2)$$

whereas the actual measured results as plotted in FIG. 13 are represented by $$Q_t=-40 \log (t)+113.6 \quad (3)$$

Figure 14:
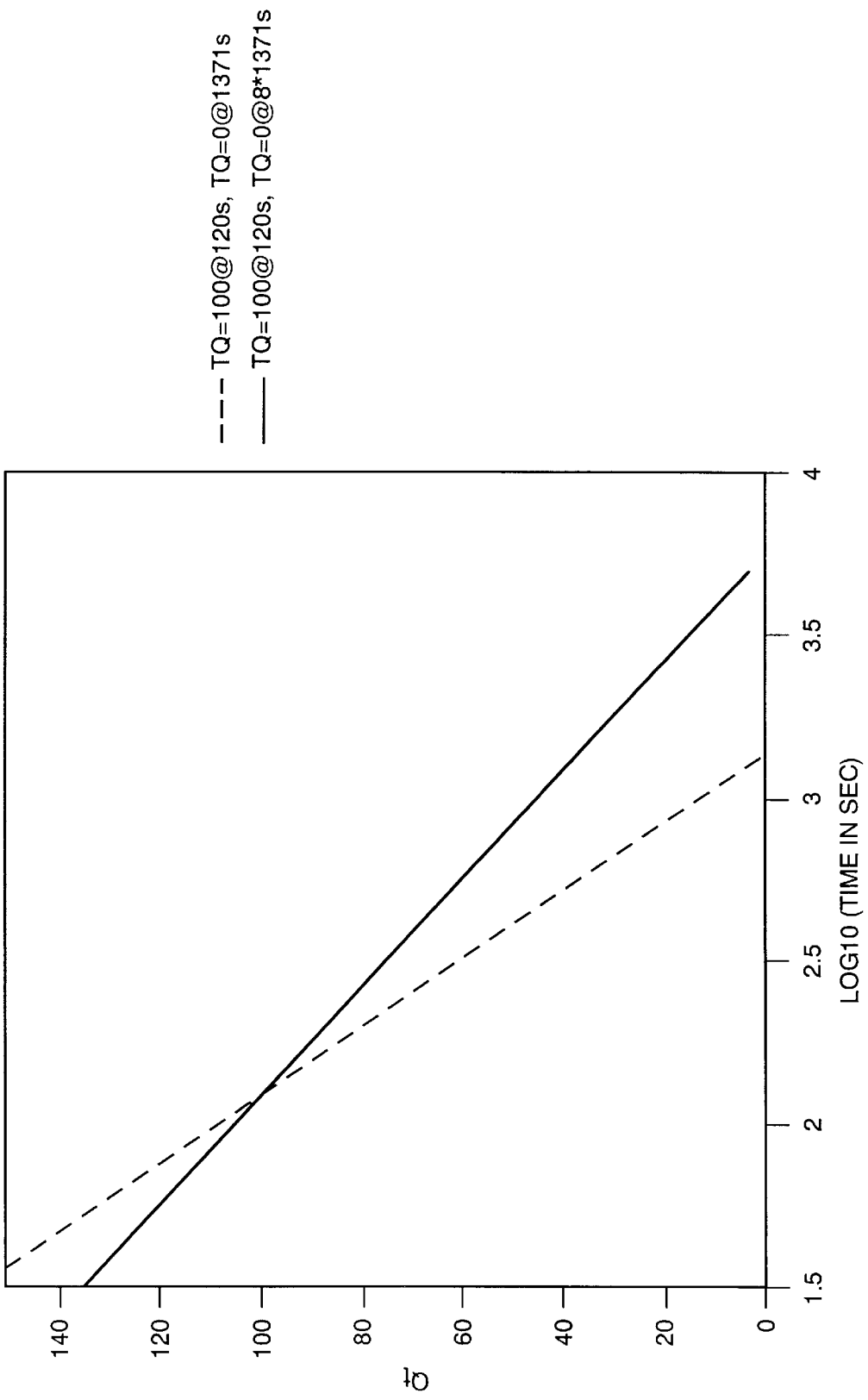
FIG. 14 is a graphical representation of perceived time quality versus processing time when varying the time quality scaling constants $C_1$ and $C_2$.

The perceived time quality $Q_t$, is effected by an alteration of scaling constants $C_1$, and $C_2$ where $C_1$ is the slope of the plotted line of FIG. 13 and $C_2$ is the offset where the line intersects the vertical axis. FIG. 14 illustrates two separate approximations of processing time versus user perceived time quality $Q_t$ with varying values of $C_1$ and $C_2$. In the testing which yielded the results as plotted in the figures, each of the constants "n", $C_1$, and $C_2$ was selected experimentally. If desired, these constants could be selected by the operator to adjust the image quality/processing time tradeoff. For instance, the operator could be presented with a sliding scale on the display 8 in FIG. 1 for selecting a tradeoff between perceived image quality and processing time by use of the keyboard 7A.

A comparison of both $IM_q$ versus processing time and CSI versus processing time is plotted in FIG. 15. Note that $IM_q$ and CSI are generally inversely related to one another with respect to processing time t. In other words, customers are only willing to wait so long for an image of acceptable quality. FIG. 15 also demonstrates that, in some cases, it is not necessary to perform all of the image processing steps available to yield an image of optimum perceived quality. Note, too, that the improvement in image quality during the first 100 seconds of processing time is about equal for each of the three resolutions plotted.

Consider the case where the resolution of the image is fixed and further that the user has a specific task in mind, such as printing a digital file from a specific printer in specific dimensions. Assume further that an image processing chain includes the above functions of sharpening, noise reduction and color mapping. Also assume that it is possible to bypass either the noise reduction or the sharpening step. The processing chains would include, (i) color mapping only, (ii) color mapping and sharpening, (iii) color mapping and noise reduction, or (iv) color mapping, sharpening and noise reduction. The virtual observer then automatically selects the processing chain and image resolution which results in a rendered image having a maximum customer satisfaction index.

III. System Overview

Figure 2:
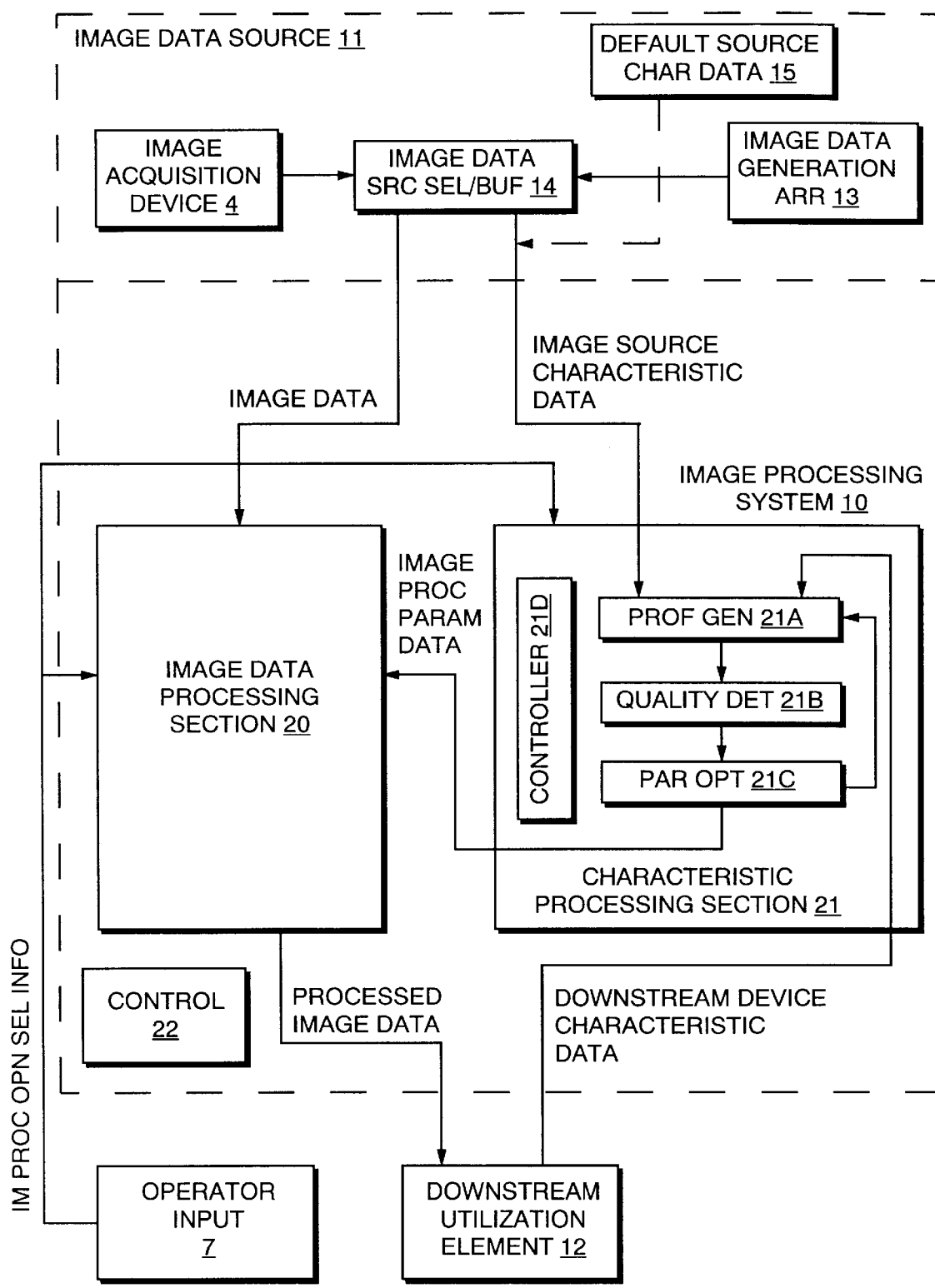
FIG. 2 is a first block diagram of one embodiment of the image processing system forming part of the image acquisition and rendering system of FIG. 1.

FIG. 1 is a diagram of an image acquisition and rendering system 2 that includes one embodiment of an image processing system 10, constructed in accordance with the principles of the invention, shown in FIG. 2. The image processing system 10 could be housed completely, or in part, in an image acquisition device 4A or 4B, in a processor module 6, in a video display device 8, or in an image rendering device 5A or 5B. With reference to FIG. 1, the image acquisition and rendering system 2 in one embodiment includes a computer 3, one or more image acquisition devices represented by a camera 4A and a document or page scanner 4B (generally identified by reference numeral 4), for acquiring an image and converting it to digital image data, and one or more image rendering devices represented by a printer 5A and a video output 5B (generally identified by reference numeral 5) for generating an output image. The computer 3, which in one embodiment is a general-purpose stored-program digital computer which comprises the image processing system 10, receives the digital image data and processes it, for example, as described below in connection with FIGS. 2 through 9 for rendering by an image rendering device.

As is conventional, the computer 3 includes a processor module 6 and operator interface elements comprising operator input components such as a keyboard 7A and/or a mouse 7B (generally identified by reference numeral 7) and operator output elements such as a video display device 8. The processor module 6 includes, for example, processor, memory and mass storage devices such as disk and/or tape storage elements (not separately shown) which perform processing and storage operations in connection with digital data provided thereto. When operating as the image processing system 10, the computer 3 will generally be executing programs which enable it to perform selected image processing operations as described below in connection with FIGS. 2 through 9 to process digital image data. The operator input elements 7 are provided to permit an operator to input information for processing. The video display device 8 is provided to display output information to the operator. Although the computer 3 is shown as comprising particular components, such as the keyboard and mouse for receiving input information from an operator, and a video display device for displaying output information to the operator, it will be appreciated that the computer system 3 may include a variety of components in addition to or instead of those depicted in FIG. 1.

In addition to comprising the image processing system 10, the computer 3 may also comprise a conventional computer graphics system for generating and editing an image in the form of digital image data. Digital image data generated by the computer graphics system may be processed in connection with the image processing system 10. In addition, processed digital image data that is generated by the image processing system 10 may be provided to the computer graphics system for editing. In connection with the computer graphics system, the computer 3 may run certain computer graphics programs. Typically, the computer 3 will use the video display device 8 to display the image to the operator as it is being generated.

Although one embodiment of the image processing system 10 has been indicated as comprising elements of a general-purpose stored-program computer 3, it will be apparent to those skilled in the art that the image processing system 10 may alternatively include special-purpose hardware and/or program components, or a combination of a computer 3 with special-purpose hardware and/or program components.

FIG. 2 is a functional block diagram of the image processing system 10. With reference to FIG. 2, the image processing system 10 obtains image data defining an image from an image data source 11, processes it as described below, and provides the processed image data to a downstream utilization element 12. The image data source 11 may provide image data from an image acquisition device 4, or from an image data generation arrangement 13, such as the computer graphics system described above. In either case, the digital image data will generally be provided to image processing system 10 through a buffer 14 or other image data source selection arrangement. In one particular embodiment, in which the image processing system 10 processes image data in digital form, the image acquisition arrangement or other image data source will provide the image data in digital form, in which the image is represented by a multi-dimensional array of picture elements, or pixels, each of which is associated with a corresponding point of the image. Each pixel is represented by digital data that defines, for example, the color and intensity of the corresponding pixel in the image. As is conventional, the digital data associated with each pixel may be in RGB format, in which the data associated with each pixel identifies the intensity of the colors red, green and blue of the pixel. Other conventional formats for representing digital image data are well known in the art.

The downstream utilization element 12 depicted in FIG. 2 may represent any of a number of types of elements or applications for using the processed image data generated by the image processing system 10 as described below. Illustrative downstream utilization elements include, for example, downstream applications such as the computer graphics system described above in connection with FIG. 1 with which an operator can run a program to interactively edit an image represented by the processed image data. Other downstream utilization elements 12 may also include, for example, ink-jet or laser printing devices for rendering a hardcopy print of the image represented by the processed image data, systems for generating color separations for use in printing plants, or the like, or merely buffering or storage of the processed image data for future use.

The image processing system 10 processes digital image data for an image in relation to an input device profile containing image source characteristic data representing selected chromatic and spatial characteristics of the particular image data source 11 which generated the image data for the system 10, and an output device profile containing downstream utilization element characteristic data representing selected chromatic and spatial characteristics of the particular downstream utilization element 12 to utilize the processed image data, and user selection information provided by an operator. It will be appreciated that the downstream utilization element 12, when it receives the processed image data from the image processing system 10, may itself perform further processing in its operations, for example, in rendering an output image, and the image processing system 10 performs the processing so that the downstream utilization element 12 will, when it performs its processing, render an image having optimal perceptual image quality according to objective metrics corresponding to predetermined psychovisual attributes. For example, if the downstream utilization element 12 is a printer for rendering images in hardcopy form, the processed image data may enable the printer to generate a rendered image having optimal perceptual image quality. Similarly, if the downstream utilization element 12 generates color separations in response to the processed image data, the processed image data may enable the generation of color separations which, when used in a printing plant, will provide rendered images having similar optimal perceptual image quality.

To attain an image having optimal perceptual image quality in accordance with the principles of the invention, the image processing system 10 includes an image data processing section 20 and a characteristic processing section 21 both under the control of a control element 22. The image data processing section 20 performs the actual processing operations as selected by the virtual observer (e.g. sharpening and color cast removal) in connection with various processing parameters represented by image processing parameter information generated by the characteristic processing section 21. The characteristic processing section 21, in turn, generates the image processing parameter information in connection with the image source characteristic data describing the selected chromatic and spatial characteristics of the image data source 11, the downstream utilization element characteristic data and the particular processing operations selected by the operator as identified by the user selection information. The image processing parameter information generated by the characteristic processing section 21 enables the image data processing section 20 to generate processed image data which represents an image having optimal perceptual image quality when processed by the downstream utilization element 12. The image source characteristic data and the destination device characteristic data are stored, respectively, as input and output device profiles.

The image data processing section 20 in one embodiment includes a number of elements which selectively process the image data under control of the virtual observer. As will be described in detail below in connection with FIGS. 5 through 8, the elements include a number of image processing "atoms" each of which performs an image processing operation, in connection with image data provided thereto. Certain operations of the atoms will be controlled in response to values of the image processing parameter data generated by the characteristic processing section 21.

The characteristic processing section 21 generates the image processing parameter data in response to information describing selected chromatic and spatial characteristics of the image data source 11 and the downstream utilization element 12. The chromatic and spatial characteristics provide information as to processing performed by the particular image data source 11 in generating the digital image data in response to the image, and by the downstream utilization element 12 after receiving the processed image data. The characteristic processing section 21 includes an image processing profile generator 21A, an image quality value generator 21B and a parameter optimizer 21C, all controlled by a controller 21D, all of which will be described in detail below in connection with FIG. 9.

Preliminarily, the image processing profile generator 21A generates processed reference values by processing the image source characteristic data resident in the input device profile, the downstream device characteristic data resident in the output device profile, the default trial parameter values stored in the parameter optimizer 21C, and the default data corresponding to the predefined initial sequence of image processing operations which could be stored, for instance, in the controller 21D. The processed reference values generated by the image processing profile generator 21A essentially represent processing which is to be performed by the image data processing section 20 upon the input image. The image quality value generator 21B generates one or more image characteristic metric values, i.e. objective metrics which correspond to predetermined psychovisual attributes as previously discussed, in response to the processed reference values generated by the image processing profile generator 21A. The parameter optimizer 21C receives the image characteristic metric values generated by the image quality value generator 21B and generates a new set of trial parameter values which are again processed by the image processing profile generator 21A. The image processing profile generator 21A, image quality value generator 21B and the parameter optimizer 21C repeat these operations through a series of iterations until the parameter optimizer determines that it has generated image processing parameter data that optimizes the image characteristic metric values generated by the image quality value generator 21B.

Figure 3:
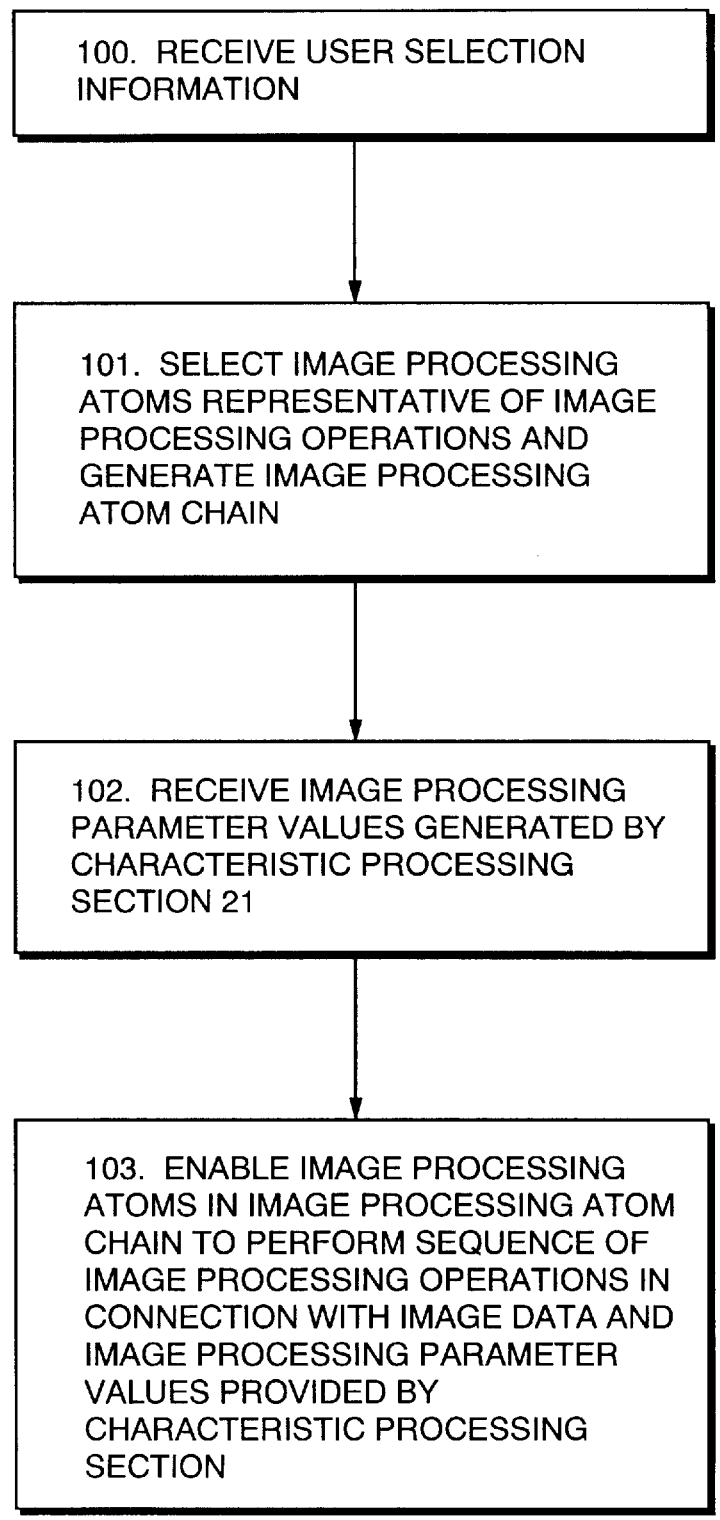
FIG. 3 is a flow chart depicting operations performed by an image data processing section as depicted in FIG. 2.

With this background, the operations performed by the image data processing section 20 and the characteristic processing section 21, both under control of the control element 22, will be generally described in connection with the flow charts depicted in FIGS. 3 and 4, respectively. Operations performed by the image data processing section 20 and characteristic processing section 21 in connection with an illustrative specific sequence of image processing operations will be described in connection with FIGS. 5 through 8. With reference initially to FIG. 3, the image data processing section 20, under control of the control element 22, will receive the user selection information for a tradeoff between processing time and image quality from the operator in step 100. The virtual observer in step 101 will automatically select image processing atoms for optimal CSI as defined in equation (1). Each of the atoms comprises an element that will perform an individual processing operation. In one embodiment, the atoms variously comprise special-purpose electronic hardware elements and/or a suitably programmed digital computer for performing the specified processing operations. The image data processing section 20 forms a chain of the image processing atoms to conform to the processing sequence.

In step 102, after control element 22 has enabled the characteristic processing section 21 to generate the particular values of the processing parameters, the control element 22 will enable the image data processing section 20 to receive the image processing parameter data from the characteristic processing section. After the image data processing section 20 establishes the processing operation atom chain in step 101 and receives the image processing parameter information in step 102, section 20 in step 103 enables the image processing atom chain to perform the sequence of image processing operations in connection with the image data from the image data source and the image processing parameter data from the characteristic processing section 21, thereby to generate the processed image data for use by the downstream utilization element 12.

Figure 4:
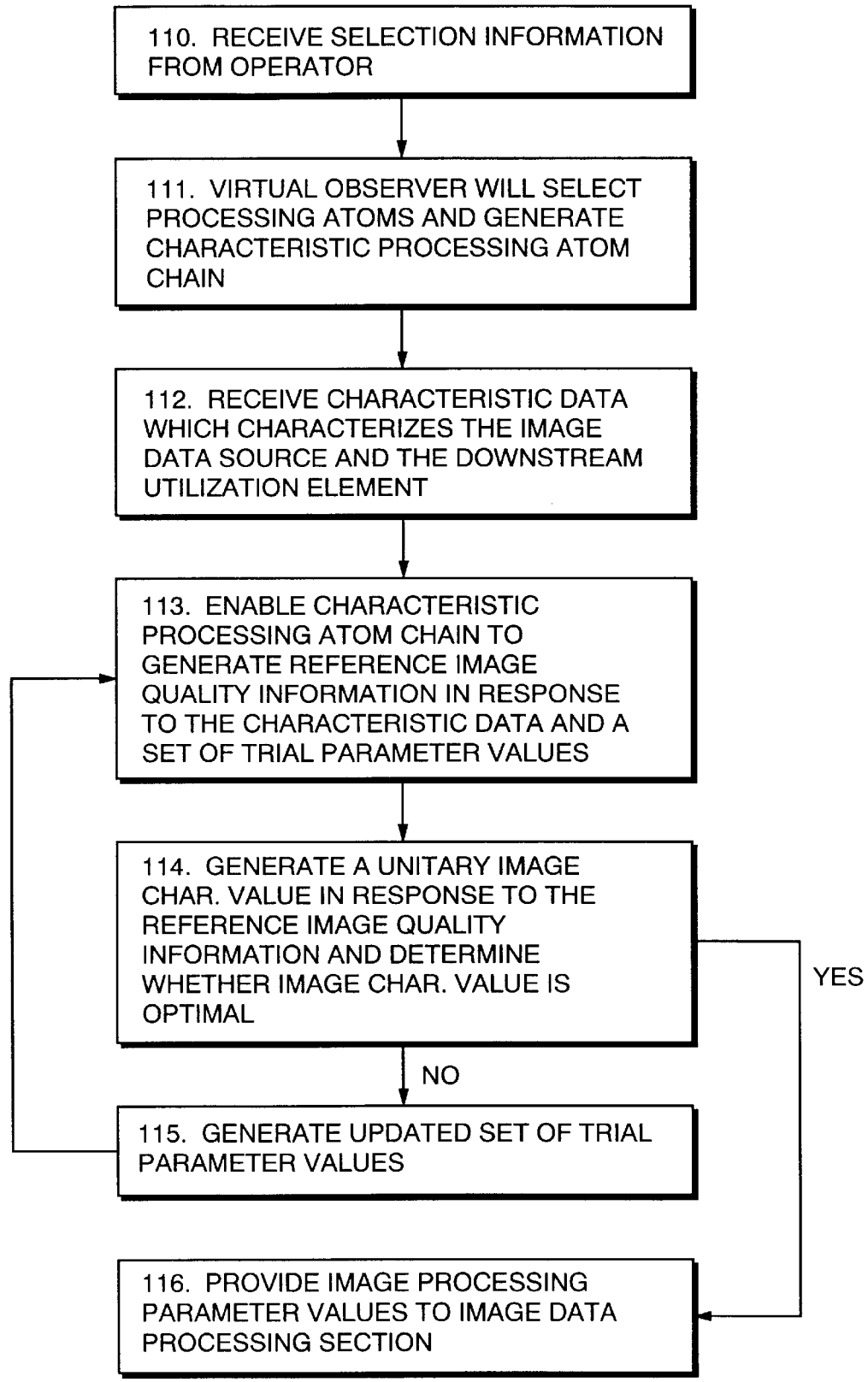
FIG. 4 is a first flow chart depicting operations performed by a characteristic processing section as depicted in FIG. 2.

The general operations performed by the characteristic processing section 21, under control of the control element 22, are depicted in FIG. 4. With reference to FIG. 4, the characteristic processing section 21, under control of the control element 22, will also receive the user selection information concerning a tradeoff between processing time and image quality from the operator in step 110, and in step 111 select image processing atoms which are representative of the image processing operations in view of the user selection information. As with the image data processing section 20, each of the atoms which may be selected by the characteristic processing section 21 by the virtual observer will comprise an element that will perform an individual processing operation. In the one embodiment noted above in connection with FIG. 3 each atom comprises a special-purpose electronic hardware element and/or a suitably programmed digital computer for performing the specified processing operation. The characteristic processing section 21, after selecting the image processing atoms, forms a chain of the image processing atoms to conform to the processing operation sequence identified by the virtual observer in step 111.

The control element 22 will also enable the characteristic processing section 21 in step 112 to receive the image source characteristic data which resides in an input device profile and relates to the image data source 11, as well as the downstream utilization element characteristic data which resides in an output device profile and relates to the downstream utilization element 12 (step 112). After the characteristic processing section 21 obtains the image source and downstream utilization element characteristic data, the control element 21D will enable the characteristic processing section 21, in particular the image profile generator 21A as described above, to use the image processing atom chain, in one embodiment, along with other elements described below in connection with FIG. 9 and further in response to the set of trial parameter values provided by the parameter optimizer 21C, to generate reference image characteristic information in step 113. The controller 21D then enables the image quality value generator 21B to generate a single image characteristic value in step 114 and the parameter optimizer 21C to determine whether the image characteristic value is optimal. If the parameter optimizer 21C determines in step 114 that the image characteristic value determined by the image quality value generator 21B is not optimal, it generates a new set of trial parameter values in step 115 and the controller 21D returns to step 113 to enable generation thereby of new reference image characteristic information. The controller 21D enables the image processing profile generator 21A, image quality value generator 21B and the parameter optimizer 21C to repeat steps 113 through 115 until the parameter optimizer 21C determines in step 114 that the image quality value is optimal. At that point, the parameter optimizer 21C will sequence to step 116 to provide the image processing parameter data to the image data processing section 20.

The characteristic processing section 21 may obtain the image source and downstream utilization element characteristic data directly from the particular image data source, such as the image acquisition device 4 or the image data generation arrangement 13, and the particular downstream utilization element 12 to which the image processing system 10 is connected, as indicated by FIG. 2. In that arrangement, the image data source 11, for example, may provide the image source characteristic data along with the image data, and, if the operator identifies the downstream utilization element 12 in the user selection information the control element 22 may enable the downstream utilization element 12 to provide the downstream utilization element characteristic data to the characteristic processing section 21 at some point before section 21 uses the information to perform its operations.

Alternatively, the image data source 11 may provide default source characteristic data from a default source characteristic library 15 which may be useful for all types of image acquisition devices 4 or image data generation arrangements 13, or it may provide default characteristic data for particular classes of such devices or arrangements. Alternatively or in addition, the image processing system 10 may maintain a library (not shown) of image source and downstream utilization element characteristic data for various types of image data sources 11 and downstream utilization elements 12, and the control element 22 can obtain the identifications of the particular type of image data source 11 and downstream utilization element 12 to be used and enable the image source and downstream utilization element characteristic data for the particular source 11 and downstream utilization element 12 to be provided to the characteristic processing section 21 from the library 15. The library 15 may, in addition to storing image source and downstream utilization element characteristic data for specific types of image data sources 11 and downstream utilization elements 12, also include image source and downstream utilization element characteristic data for classes of sources 11 and downstream utilization elements 12 (such as photographic cameras, video cameras and the like for sources 11, and printers and display devices of various types or from various manufacturers for downstream utilization elements 12), as well as default chromatic and spatial characteristic data, and if it does not have chromatic and spatial characteristic data for the particular source 11 or downstream utilization element 12 it can provide the class chromatic and spatial characteristic data or default data to the characteristic processing section 21 for use in its processing.

It will be appreciated that the image processing system 10 provides a unified image processing system 10 which will enable the processing and automatic enhancement of images provided by a wide variety of types of image data sources 11 to be provided to a wide variety of downstream utilization elements 12, in particular enabling visually optimal images to be rendered or displayed by a wide variety of printing or display devices in a wide variety of formats. The system 10 allows the virtual observer to select the image processing operations to be performed by the image data processing section 20 in connection with the actual image data, and further provides for the processing to be performed in connection with the image parameters whose values are generated by the characteristic processing section 21. The characteristic processing section 21 generates the values of the various parameters comprising the image processing parameter data in accordance with principles developed from psychovisual testing, and thus represents a synthetic image observer, i.e. the virtual observer, for the particular image data source that generated the image data, the particular destination utilization element that is to receive the processed image data, and the image processing operations to be performed by the image data processing section 20. The characteristic processing section 21 optimizes the values of the particular parameters that it generates to provide for an optimal image as produced by the characteristic processing section 21.

In one embodiment, the characteristic processing section 21 generates the image processing parameter data to control the portions of the image processing data chains generated by the image data processing section 20 that affect the spatial attributes of an image whose image data is being processed. In that embodiment, the image data processing section 20 processes the portion of the image data comprising color information in accordance with color matching and tone reproduction arrangements as described below.

IV. Detailed Description of the Image Processing System 10

A. The Image Data Processing Section 20

In one specific embodiment of the image processing system 10, which will be described in connection with FIGS. 5 through 9, the atoms used by the image data processing section 20 and the characteristic data processing section 21 are organized into molecules, with each molecule comprising one or more selected atoms which are organized in a predetermined series, or chain, within the molecule. In that embodiment, the molecules are further organized into molecule classes, and the image data processing section 20 and characteristic data processing section 21, in response to the user selection information from the operator, will select a molecule from within each molecule class in establishing the image data or characteristic data processing chain. As will be described below, within each molecule class, the molecules will perform similar operations, but the atoms comprising the molecules within each molecule class will generally perform the operations differently; in one embodiment some molecules within a molecule class may perform the operations faster, but with somewhat reduced image quality than other molecules. The sequence of operations within a molecule class is selected by the virtual observer for optimizing CSI. The particular optimized sequence is determined by trial and error in the characteristic processing section 21 as previously described.

Figure 5:
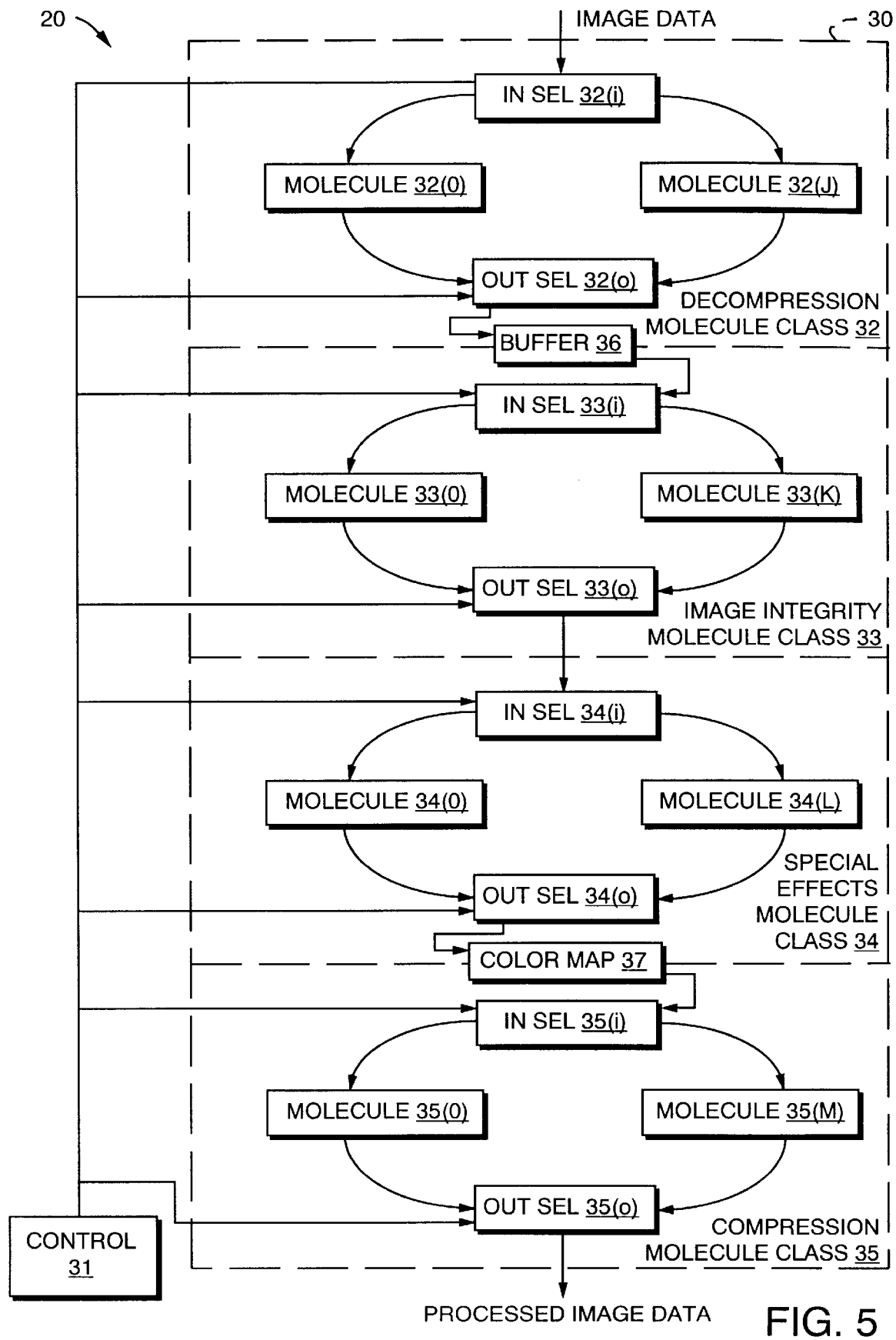
FIG. 5 is a functional block diagram illustrating the general structure of the image data processing section as depicted in FIG. 2.

More specifically, and with reference to FIG. 5, the image data processing section 20 includes an image data processing library 30 and an image data processing control element 31. The image data processing control element 31 controls processing of the image data in response to the image processing parameter data and the user selection information. The image data processing library 30 comprises a series of molecule classes, including but not limited to, an image data decompression molecule class 32, an image integrity molecule class 33, a special effects molecule class 34 and an image data compression molecule class 35 which are organized in a series or chain between the image data source 11 and downstream utilization element 12. The image data decompression molecule class 32, in turn, includes one or more image data decompression molecules 32(0) through 32(J) (generally identified by reference numeral 32(j)), each of which includes one or more atoms (described below in more detail in connection with FIG. 6), which, if enabled by the image data processing control element 31 in response to image processing parameter data and user selection information, performs a data decompression operation in connection with image data provided by the image data source 11. Similarly, the image integrity molecule class 33 includes one or more image integrity molecules 33(0) through 33(K) (generally identified by reference numeral 33(k)), each of which includes one or more atoms (described below in more detail in connection with FIG. 7). The atoms of each of the image integrity molecules 33(k) perform a number of operations, such as noise reduction, sharpening, burning and dodging, etc. in connection with the image data, as enabled by the image data processing control element 31 in response to the image processing parameter data and the user selection information.

In addition, the special effects molecule class 34 includes one or more special effects molecules 34(0) through 34(L) (generally identified by reference numeral 34(l), each of which also includes one or more atoms. Each of the special effects modules 34(l) performs one or more operations, such as image flipping, stretching and skewing, and in addition performs large kernel sharpening and color reassignment. These operations are also enabled by the image data processing control element 31 in response to the image processing parameter data and the user selection information. Finally, the image data compression molecule class 35 includes one or more image data compression molecules 35(0) through 35(M) (generally identified by reference numeral 35(m)), each of which includes one or more atoms (described in more detail below in connection with FIG. 8) which if enabled by the image data processing control element 31 in response to the image processing parameter data and the user selection information, performs a data decompression operation in connection with image data provided to the downstream utilization element 12.

In the embodiment depicted in FIG. 5, the image data processing library 30 also includes a buffer 36 for buffering decompressed image data as provided by the selected molecule 32(j) of the image data decompression molecule 32 prior to the decompressed image data being processed by the selected molecule 33(k) of the image integrity molecule class 33. Although only one buffer 36 is provided in the image data processing library 30 depicted in FIG. 5, it will be appreciated that other buffers may also be provided between other molecule classes. In addition, the image data processing library 30 includes a color map 37 for receiving data from the special effects molecule class 34 and for performing color mapping in connection with the data. That is, the color map 37 maps one or more of the colors represented by the data input thereto from the special effects molecule class 34 to one or more other colors, thereby to alter the coloring of the image, with the mapping being controlled by the image processing control element 31.

As noted above, each of the molecule classes 32–35 in the image data processing library 30 includes one or more molecules, with one molecule in each molecule class being selected, in particular by the image data processing control element 31, during an image processing operation in response to the image processing parameter data and the user selection information. Each molecule class is associated with a molecule input selector $32(i)$, $33(i)$, $34(i)$ and $35(i)$, respectively, which couples data that is input to the molecule class 32, 33, 34, 35 either from the image data source 11 or a preceding molecule class in the chain to one selected molecule $32(j_s)$, $33(k_s)$, $34(l_s)$, $35(m_s)$, in the molecule class, the one molecule being selected by the image data processing control element 31. In addition, each molecule class 32, 33, 34, 35 is associated with a molecule output selector $32(o)$, $33(o)$, $34(o)$, $35(o)$, which couples data that is output from the molecule class 32, 33, 34, 35 either to a succeeding molecule class in the chain or to the downstream utilization element 12 from the same selected molecule $32(j_s)$, $33(k_s)$, $34(l_s)$, $35(m_s)$, in the molecule class. The image data processing control element 31 uses the molecule input selector $32(i)$, $33(i)$, $34(i)$, $35(i)$ and molecule output selector $32(o)$, $33(o)$, $34(o)$, $35(o)$ of each molecule class 32, 33, 34, 35, to control selection of the particular molecule in the molecule class which is to perform processing during an image processing operation.

Figure 6:
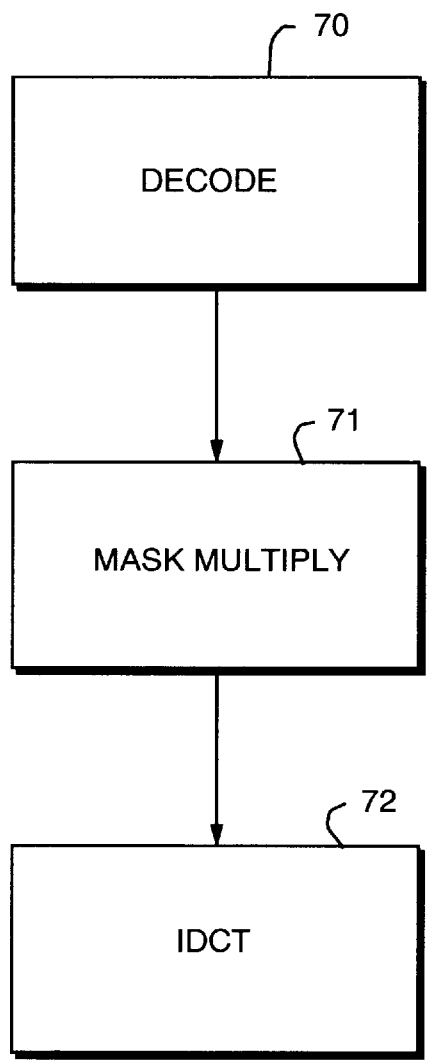
FIGS. 6 through 8 are detailed functional block diagrams illustrating details of portions of the image data processing section depicted in FIG. 5.
Figure 7:
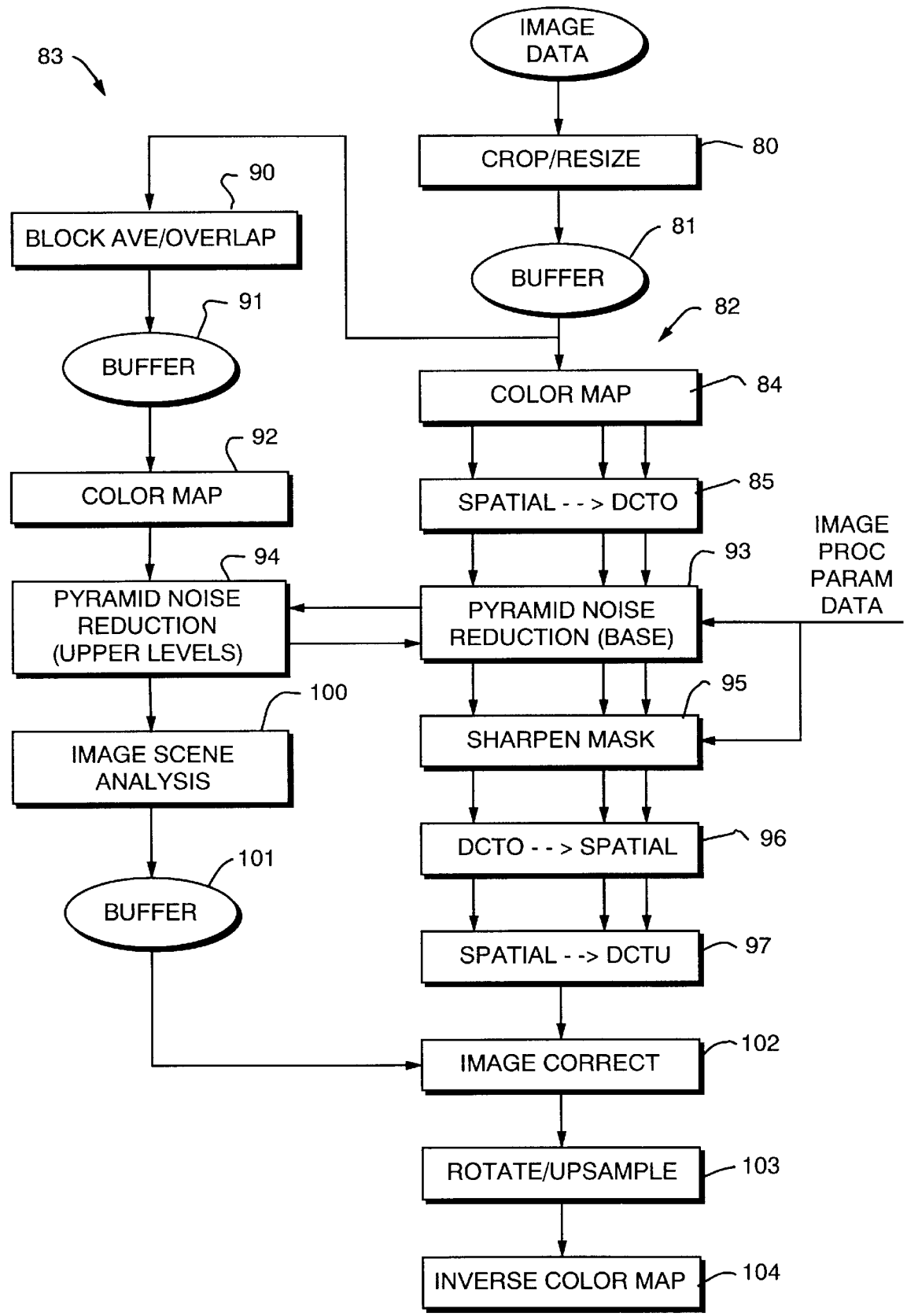
Figure 8:
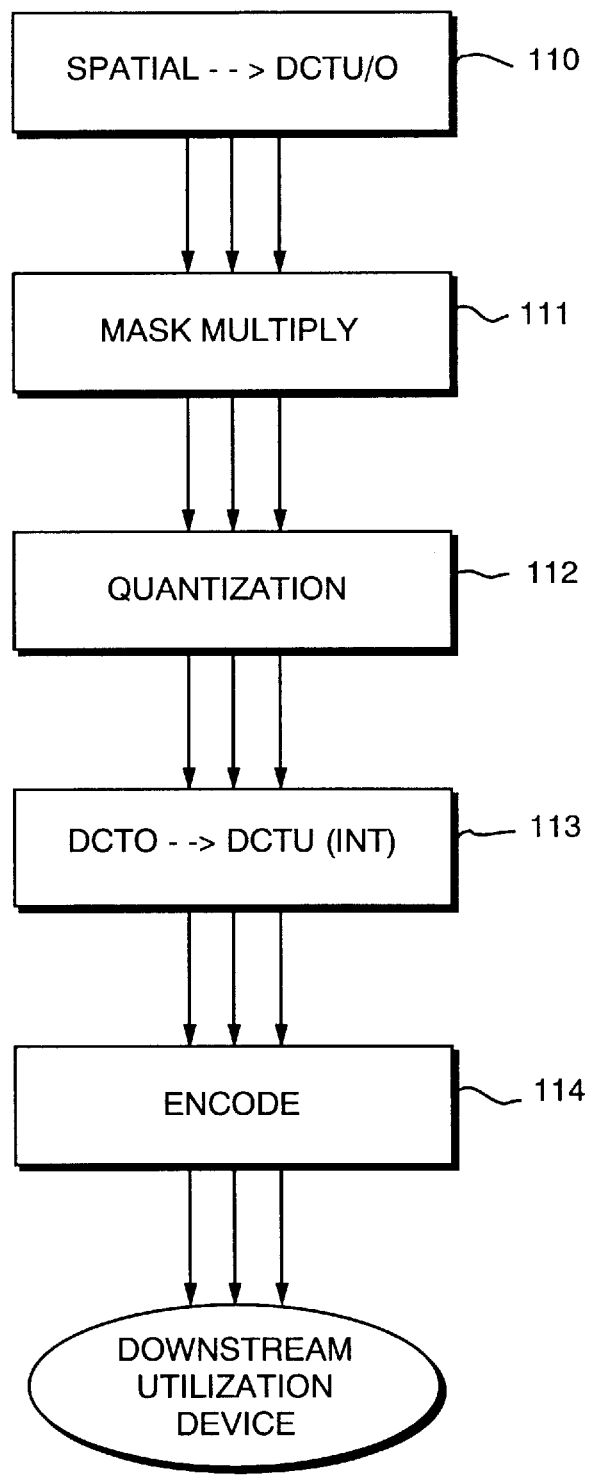

A specific example of the architectures of specific molecules in the various molecule classes 32–35 comprising the image data processing section 20 will be described in connection with FIGS. 6 through 8. FIG. 6 depicts a molecule 32(j) of the decompression molecule class 32, FIG. 7 depicts a molecule 33(k) of the image integrity molecule class 33, and FIG. 8 depicts a molecule (35(m)) of the compression molecule class 35. With reference initially to FIG. 6, and as described above in connection with FIG. 5, the decompression molecule class 32 includes a plurality of molecules 32(0) through 32(J), each of which performs a particular type of decompression operation in connection with the image data from, for example, the image data source 11. If the image data from the image data source 11 is in compressed form, based on a particular compression methodology, the virtual observer will automatically identify the particular decompression operation based on the compression methodology, and the image data processing control element 31 may control the selectors 32(i) and 32(o) based on that information to enable decompression based on the particular compression methodology. Alternatively, the compression methodology may be identified in another manner, such as by information contained in the image data itself.

In one embodiment, illustrative molecules perform image data decompression based on the conventional JPEG (Joint Photographic Experts Group) standard JPEG DIS 10918 (molecule 32(0)), wavelet decompression (molecule 32(1)), and sub-band decompression (molecule 32(2)), although it will be recognized that other molecules 32(j) may also be provided to perform image data decompression in connection with other methodologies. The structure of one decompression molecule, namely, JPEG decompression molecule 32(0) is depicted in detail in FIG. 6. As shown in FIG. 6, molecule 32(0) includes three elements: a decode element 70, a mask multiply element 71, and an inverse discrete cosine transform (IDCT) element 72. The molecule 32(0) is used in connection with compressed image data that is (i) in the form of discrete cosine transform (DCT) coefficients (that is, a DCT operation has been performed in connection with the pixel data defining the pixels comprising the image, and the image data that is provided to the JPEG compression molecule 32(0) comprises the DCT coefficients generated in response to the DCT operation) and (ii) is encoded using the well-known Huffman encoding method. As shown in FIG. 6, compressed image data may be provided separately for each of the primary colors with which the image is recorded. The decode element 70 decodes the Huffman-encoded DCT coefficients to generate the actual DCT coefficient values, and the mask multiply element 71 multiplies the DCT coefficients by the conventional JPEG quantization mask matrix. As is conventional, since the image is two-dimensional, the DCT coefficients defining the image as decoded by the decoded element 70 are in the form of a two-dimensional matrix, and the mask matrix used by the mask multiply element 71 is also a two-dimensional matrix. The mask multiply element 71 multiplies correspondingly-positioned matrix elements of the DCT coefficient matrix and the JPEG quantization mask matrix in performing the mask multiply operation essentially to generate a masked DCT coefficient matrix. Finally, the inverse DCT element 72 performs an inverse discrete cosine transform operation in connection with the masked DCT coefficient matrix to generate spatial image data, that is, data defining pixel values for an image. It will be appreciated that the JPEG decompression molecule 32(0) does not operate in connection with values of parameters from the characteristic processing section 21, since the decompression operation will not result in transformations that affect image quality.

The detailed structure of other molecules 32(j), other than JPEG decompression molecule 32(0), in the decompression molecule class 32 will depend upon the particular series of operations required to perform decompression, which will be readily apparent to those skilled in the art.

FIG. 7 depicts the detailed structure of molecules 33(k) of the image integrity molecule class 33. In one particular embodiment, the molecules 33(k) all include atoms for performing generally the same operations in the same order, but they will do them in diverse manners, so that some molecules 33(k) will perform the operations generally quickly but with somewhat reduced image quality and other molecules 33(k) may perform the operations more slowly with enhanced image quality. In addition, the particular ones of the available operations that are to be performed by the particular molecule 33(k) are specified by the virtual observer through trial and error in the characteristic processing section 21. Since the molecules 33(k) include atoms for performing generally the same operations, they are structured generally similarly, and so the general structure of only one molecule, namely, molecule 33(0), is shown in detail in FIG. 7.

As shown in FIG. 7, molecule 33(0) receives the decompressed image data from a decompression molecule 32(j) in the decompression molecule class 32. As indicated above, the decompressed image data as supplied by the decompression molecule class 32 is in spatial form, with the data defining pixel values for the image. A crop/resize element 80 is provided to enable the image to be cropped or resized in response to the user selection information from the operator. The output of the crop/resize element 80 is buffered in a buffer 81. The output of buffer 81 is coupled to two processing channels, including a fine processing channel 82 and a coarse processing channel 83. The fine processing channel 82 processes the actual pixel data provided by the crop-resize element 80, while the coarse processing channel generates a series or hierarchy of images of varying degrees of coarseness. In generating the coarse image for each level in the hierarchy, the coarse processing channel 83 essentially forms each pixel in response to pixel values from blocks of selected numbers of pixels in the next lower level, with the coarse image for the lowest level in the hierarchy being generated from blocks of pixel data for pixels in the actual image (that is, the pixel data as provided by the buffer 81). Accordingly, the actual pixel data and the pixel data defining the successive ones of the series of coarse images in the hierarchy conceptually form a pyramid, with images at progressively higher levels in the hierarchy having progressively fewer pixels.

In the fine processing channel 82, a color map element 84 receives the pixel data from the buffer 81. As indicated above, the pixel data of the image is essentially represented by the intensity levels of the various colors, such as red, green and blue, which are transformed to another color space, such as L*a*b*. The luminance data L* and the chrominance data a* and b* is in spatial form, and an overlapped DCT element 85 is provided to perform a discrete cosine transform in connection with the luminance and chrominance data to generate an overlapped DCT coefficient matrix in connection with the luminance and chrominance information.

In the coarse processing channel 83, a block average/overlap element 90 generates the pixel data for the hierarchy of coarse images as described above, and provides it to a buffer 91. As with the pixel data in the fine processing channel 82 as described above, the pixel data for each of the coarse images represents the intensity level of various primary colors comprising the image, and a color map 92 is provided to convert the primary color pixel data to luminance and chrominance form.

The overlapped DCT coefficient matrix from the overlapped DCT element 85 of the fine processing channel 82, and the luminance and chrominance data from the color map element 92 of the coarse processing channel 83, are provided to a noise reduction element jointly comprising a base noise reduction element 93 and an upper-level noise reduction element 94. If noise-reduction is enabled by the virtual observer, then the base noise reduction element 93 and upper-level noise reduction element 94 cooperate to perform a noise reduction operation in connection with the overlapped DCT coefficient matrix that the base noise reduction element 93 receives from the overlapped DCT element 85, and further in connection with image processing parameter data provided by the characteristic processing section 21, thereby to reduce noise in the image represented thereto.

In one particular embodiment, the noise reduction operations performed by the base noise reduction element 93 and upper-level noise reduction element 94 are automatically performed as generally described in U.S. patent application Ser. No. 08/440,639 filed on May 15, 1995, and will only generally be described herein. In that embodiment, the upper level noise reduction element 94 uses the upper levels of the hierarchy of coarse images to generate noise reduction information which is provided to the base level noise reduction element 93. In that operation, the upper level noise reduction element 94 generates a series of coarse images forming a hierarchy. To form each image in the hierarchy, the upper level noise reduction element 94 divides the pixels in the image in the next lower level into a set of blocks or "tiles," and a single pixel value is generated for the tile, which single pixel value is taken as the pixel value of a correspondingly-positioned pixel in the image at the next higher level of the hierarchy. The upper level noise reduction element generates the single pixel value as the DCT transform of the pixels in each tile is generated, and the value of the zero-the order DCT coefficient so generated is determined as the single pixel value.

After generating the various images in the hierarchy, the upper level noise reduction element 94, uses the values of noise reduction parameters, which form part of the image processing parameter data from the characteristic processing section 21, and the upper level image (that is, the coarsest image) in the hierarchy to generate a noise reduction mask that is used to correct the values of the DCT coefficients defining the upper level image. The upper level noise reduction element 94 propagates the corrected DCT coefficient values to the image at the next lower level in the hierarchy, and repeats the operation. After repeating the operations through the upper levels in the hierarchy, the upper level noise reduction element provides corrected DCT coefficient values to the base level noise reduction element, which performs similar operations in connection with the DCT coefficients for the actual image.

The noise-reduced overlapped DCT coefficient matrix generated by the base noise reduction element 93 is coupled to a sharpening element 95. If image sharpening is enabled by the virtual observer, then the sharpening element 95 performs an image sharpening operation in response to the noise-reduced overlapped DCT coefficient matrix and further in response to image processing parameter data from the characteristic processing section 21. As will be described in more detail below, in performing the image sharpening operation, the sharpening element 95 generates a sharpening mask matrix in response to the image processing parameter data, and then multiplies corresponding matrix elements of the sharpening mask and noise-reduced overlapped DCT coefficient matrix. An inverse DCT element 96 is provided to convert the overlapped DCT coefficient matrix to spatial pixel data values, which contain luminance and chrominance information for the noise-reduced and sharpened image. In addition, a DCT element 97 is provided to perform a non-overlapped discrete cosine transform operation in connection with the pixel data values from inverse DCT element 96, if enabled by the virtual observer.

Returning to the coarse processing channel 83, the upper-level noise reduction element 94 also generates an output which, if noise-reduction is enabled by the virtual observer, represents noise-reduced pixel values for the images comprising the upper levels in the image hierarchy. In any case, the output of the upper-level noise reduction element 94 is coupled to an image scene analysis element 100. If scene analysis enabled, then certain portions of the image containing image details are identified for enhancement, whereby the image scene analysis element 100 determines pixel value adjustments to accomplish the required alteration of the image. The image scene analysis element 100 operates automatically in a manner similar to that generally described in U.S. patent application Ser. No. 08/414,750 filed on Mar. 31, 1995, incorporated herein by reference, and will not be described herein in detail, and may also include a burning-and-dodging element. The pixel value adjustments from the image scene analysis element 100 are coupled to a buffer 101 for intermediate storage.

The output from the non-overlapped DCT element 97 and pixel value adjustment values buffered in buffer 101, if any, are coupled to an image correction element 102. If the virtual observer enables image scene analysis/burning and dodging, the non-overlapped DCT element 97 is disabled, in which case the values passed to the image correction element 102 by the element 97 are the spatial pixel values from the inverse DCT element 96. In that case, the image correction element 102 produces corrected image pixel values in response to the spatial pixel values and the pixel value adjustment values from buffer 101. The adjusted pixel values generated by the image correction element 102 are coupled to a rotate/upsample element 103, which processes the adjusted pixel values to effect a rotation of the image through an angle specified by the operator. Finally, the rotated adjusted coefficient matrix generated by the rotate/upsample element 103 is coupled to an inverse color map element which, if color mapping is enabled by the virtual observer as described above in connection with elements 84 and 92, and converts the luminance and chrominance pixel information to selected color pixel information as the output of the molecule 33(0). If the virtual observer has enabled the non-overlapped DCT element 97, then the elements 102 through 104 would be disabled, in which case the non-overlapped DCT coefficient values would be provided as the output of the molecule 33(0).

It will be appreciated that the particular order in which the image data processing section 20 initiates the operations that are to be performed by the enabled atoms in the molecule 33(0) will optimize the CSI, and therefore may differ from the example described above. In particular, the operations of the coarse processing chain 83 may be performed prior to the performance of any of the operations of the fine processing chain 82, since the processing in connection with the coarse processing chain 83 produces global adjustments which will be used in connection with the fine processing chain 82. In any case, if noise-reduction is enabled, the upper-level noise reduction element 94 will perform its operations prior to noise reduction by the base noise reduction element 93, since the base noise reduction information uses noise reduction information generated by the upper-level noise reduction element 94. In addition, the image scene analysis/burning and dodging element 100, if enabled, will perform its operations prior to the image correction element 102, since the operations performed by the image correction element 102 will use information generated by the image scene analysis/burning and dodging element 100.

In one embodiment, the color mapping described above in connection with the color mapping elements 84 and 92 is performed by means of a look-up table (not separately shown) which maps the RGB pixel color values to L*a*b* values, and vice-versa for the inverse color mapping element 104. The look-up tables that are used in the color mapping and inverse color mapping elements 84, 92 and 104 for particular image data reflect the particular type of image acquisition device 4 or image data generation arrangement 13 which generated the image data and the particular downstream utilization element 12 to utilize the image data. The values used in the look-up tables are generated to map one color space into another, preferably using device-independent color spaces as intermediaries.

Each of the diverse molecules **34(*l*) comprising the special effect molecule class 34 comprises one or more atoms that jointly perform one type of special effects operation in connection with the image data, such as image annotation, color mapping to a palette, and so forth, as enabled by the virtual observer. It will be appreciated that the structure and operation of each molecule 34(*l*) will depend on the particular type of special effects operations to be performed, but the general structures of the molecules 34(*l*)** will be apparent from the above description and will not be further presented herein.

FIG. 8 depicts molecules **35(*m*) of the compression molecule class 35. As shown in FIG. 8, and as described above in connection with FIG. 5, the compression molecule class 35 includes a plurality of molecules 35(0) through 35(M), each of which performs a particular type of compression operation in connection with the data it receives from the special effects molecule class 34, and compresses it prior to transferring it to the downstream utilization element 12, if enabled by the virtual observer. Each of the molecules 35(*m*) performs compression in connection with a selected compression methodology, and if a particular compression methodology is enabled, the image data processing control element 31 controls the selectors 35(*i*) and 35(*o*)** based on that information to enable compression based on the selected compression methodology.

In the one embodiment described above in connection with FIG. 5, illustrative molecules **35(*m*) perform image data compression based on the same methodologies as used by the molecules 32(*j*) in performing image data decompression. In particular, molecules may be provided to perform data compression based on the conventional JPEG (Joint Photographic Experts Group) standard JPEG DIS 10918 (molecule 35(0)), noted above, wavelet compression (molecule 35(1)), and sub-band compression (molecule 35(2)), although it will be recognized that other molecules 35(*m*) may also be provided to perform compression in connection with other methodologies. The structure of one compression molecule, namely, JPEG compression molecule 35(0) is depicted in detail in FIG. 8. As shown in FIG. 8, molecule 35(0), includes five elements, including a DCT element 110, a mask multiply element 111, a quantization element 112, a DCT conversion element 113, and an encode element 114. If the output of the special effects molecule class 34 comprises image pixel data, the virtual observer will enable the DCT element 10 to perform a two-dimensional discrete cosine transform operation in connection therewith, in either overlapped or non-overlapped form to generate a DCT coefficient matrix. The elements 111, 112 and 114 of the molecule 35(0) will be jointly enabled or disabled in response to the user selection information from the operator, and DCT conversion element 113 will be selectively enabled or disabled depending on whether DCT element 110 generated the DCT coefficient matrix in overlapped form or non-overlapped form. If the elements 111, 112 and 114 are enabled, mask multiply element 111 performs a mask multiply operation in connection with the DCT coefficient matrix from DCT element 110 using a mask matrix essentially to provide a masking operation inverse or complementary to that performed by the element 71 (FIG. 6). The quantization element 112 performs a quantization operation, as described below, to quantize the elements of the DCT coefficient matrix in connection with a quantization parameter provided thereto by the characteristic processing section 21 in the image processing parameter data. If the DCT element 110 used an overlapped discrete cosine transform to generate the DCT coefficient matrix, the DCT conversion element 113 is enabled to convert the quantized overlapped DCT coefficient matrix to non-overlapped form, retaining only the integer portions of the matrix element values. Finally, the encode element 114 encodes the matrix elements output by the DCT conversion element 113** conveniently using, for example, the well known Huffman encoding methodology.

As noted above, image processing parameter data provided by the characteristic processing section 21 is used in three particular elements of the illustrative molecules 33(0) and 35(0), namely, the atoms 93 and 94 for performing noise reduction, the sharpening atom 95, and the quantization atom 112. It will be appreciated that these atoms perform processing in connection with the data input thereto in such a manner as to modify the appearance of the image defined by the image data, in such a way that relates to selected image characteristics of the image data source 11 and downstream utilization element 12 and so these atoms operate in relation to image processing parameter information provided by the characteristic processing section 21.

B. The Characteristic Processing Section 21

As described above, the characteristic processing section 21 generates the image processing parameter data to be used by the image data processing section 20 in processing the image data in relation to the specific device or methodology used to acquire the image data, and the specific device or methodology to be used, for example, in rendering the image after the image processing system 10 provides the processed image data to the downstream utilization element 12. In one embodiment, the characteristic processing section 21 generates the image processing parameter information in response to image source and downstream utilization element characteristic data comprising a modulation transfer function and a Wiener noise spectrum function. The modulation transfer function and the Wiener noise spectrum for an optical system define the image data modulation and spatial filtering performed by the system in generating its output in response to its input, and image noise generated by the system in generating the output. Generally, the modulation transfer functions, identified here as $MTF_i(f)$ for the image source characteristic data, and $MTF_o(f)$ for the downstream utilization element characteristic data, identify how the image data source 11 and downstream utilization element 12, respectively, modulate the appearance of the image during, for example, image acquisition in the case of the image data source, and rendering in the case of the downstream utilization element. In general, for a monochrome optical system, if the spatial distributions of the input to and output from the optical system are given by $I_i(x,y)$ and $I_o(x,y)$, respectively, where x and y represent the conventional coordinate axes, the optical transfer function $\mathcal{H}(\omega_x, \omega_y)$ corresponds to the ratio of the two dimensional Fourier transform $\mathcal{I}_o(\omega_x, \omega_y)$ of the spatial output distribution $I_o(x,y)$ to the two dimensional Fourier transform $\mathcal{I}_i(\omega_x, \omega_y)$ of the input spatial distribution $I_i(x,y)$ [otherwise stated, the optical transfer function is defined as $\mathcal{I}_o(\omega_x, \omega_y) = \mathcal{H}(\omega_x, \omega_y) * \mathcal{I}_i(\omega_x, \omega_y)$, where * refers to the multiplication operation], and the modulation transfer function MTF(f) of the optical system is the absolute value of the optical transfer function $|\mathcal{H}(\omega_x, \omega_y)|$. The Wiener spectrum characterizes the noise in the image, including that noise introduced with the original data provided by image data source 11, noise added or removed in successive processing operations in image data processing section 20, and noise introduced during rendering by the downstream utilization element. The Wiener spectrum is most easily evaluated by observing the data fluctuations in the rendered image in the case that a uniform source image is presented to the system.

As noted above, the modulation transfer function and the Wiener noise spectrum for an imaging system together define the spatial filtering performed by the system in generating its output in response to its input, and the noise produced by the system in generating the output. Accordingly, the modulation transfer function and Wiener noise spectrum for a specific image data source 11 essentially define spatial processing performed by the image data source 11 in acquiring or generating the image data from, for example, a source image or a physical object, and the modulation transfer function and Wiener noise spectrum for a specific downstream utilization element 12 essentially define the processing performed by the downstream utilization element in rendering an image. If different optical systems, or different types of optical systems, process their inputs differently, they will have different modulation transfer functions and Wiener noise spectra. In generating the image processing parameter information, the characteristic processing section 21 essentially performs the processing operations in the order selected by the virtual observer, in connection with the specific modulation transfer functions and Wiener noise spectra of the specific image data source 11 and the downstream utilization element 12.

With this background, as shown in FIG. 2, the characteristic processing section 21 includes an image processing profile generator 21A, an image quality value generator 21B and a parameter optimizer 21C, all controlled by a controller 21D to generate a set of values corresponding to an optimal CSI for parameters to be used by the image data processing section 20. These elements will be described in detail in connection with FIG. 9. It will be appreciated that the particular characteristic processing atoms that will be accessible to the controller 21D in any particular embodiment of image processing system 10 will be those that depend on the parameters that may be used by the collection of atoms in the molecules and molecule classes comprising the image data processing library 30; a specific example of characteristic processing atoms that will be used in connection with the particular image processing atoms described above in connection with FIGS. 6 through 8 will be described below in connection with FIG. 9. The virtual observer will automatically select and link particular ones of the characteristic processing atoms to form the characteristic processing chain of atoms (step 111, FIG. 4 above) and then use the processing chain to generate the image processing parameter data.

Figure 9:
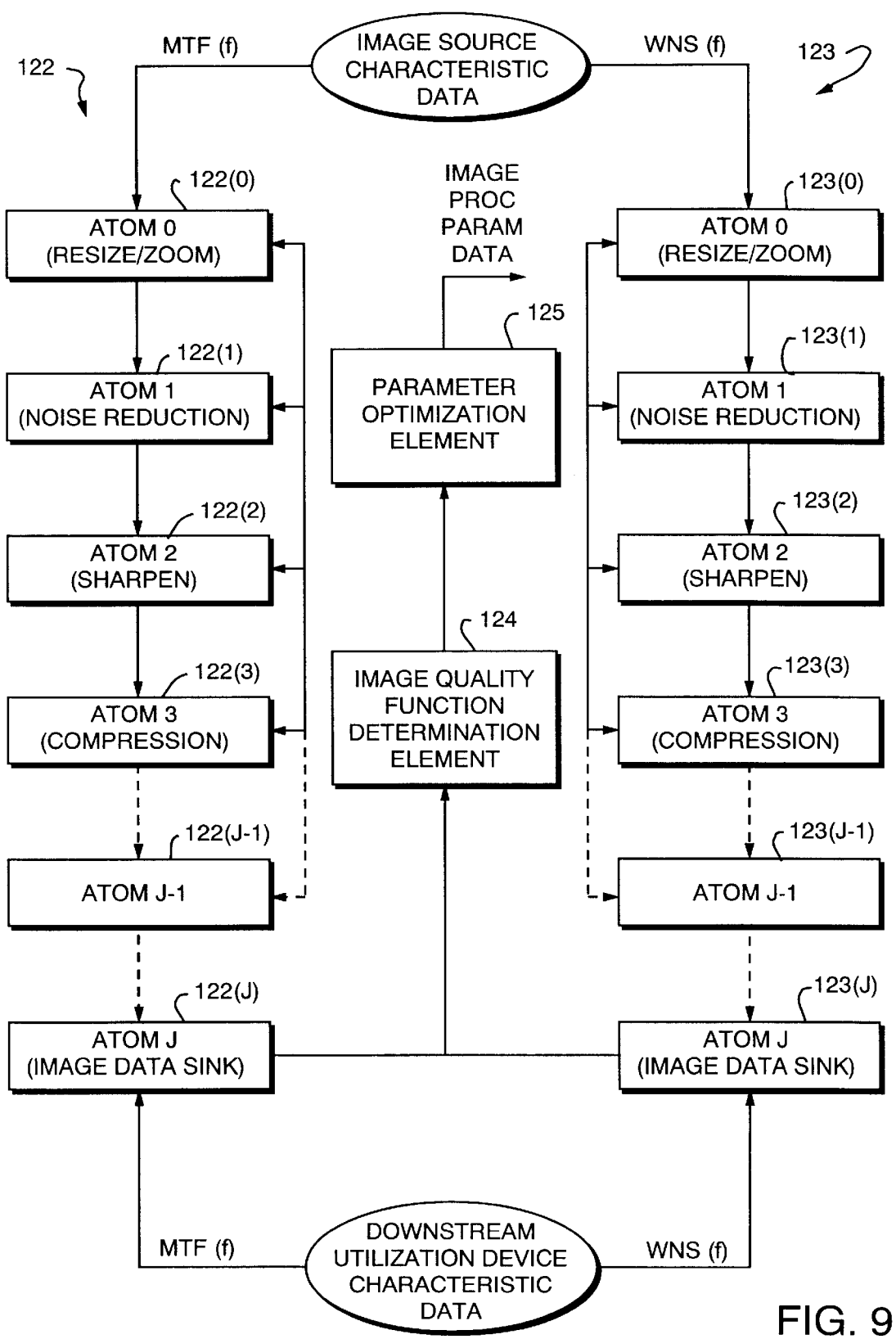
FIG. 9 is a detailed functional block diagram illustrating the characteristic processing section of FIG. 2.

A specific illustrative characteristic processing chain is shown in FIG. 9. As noted above, in one embodiment the image source and downstream utilization element characteristic data comprises modulation transfer function information and Wiener noise spectrum information, and in that embodiment the characteristic processing controller 21D actually establishes the image processing profile generator 21A as two characteristic processing chains, one, identified by reference numeral 122, for processing the modulation transfer function information and the other, identified by reference numeral 123, for processing the Wiener noise spectrum information. The sequence of atoms in each of the chains 122 and 123 corresponds to the sequence of the atoms that perform spatial processing of image data in the selected molecules 32–35 which are selected by the virtual observer in the image data processing library 30. Thus, if the molecules 32(0) (FIG. 5), 33(0) (FIG. 6), and 35(0) (FIG. 7), as described above, are selected, and if all of the atoms which perform spatial processing in connection with the image data are enabled, the characteristic processing controller 21D will establish the chains 122 and 123 as shown in FIG. 9.

Accordingly, with reference to FIG. 9, the modulation transfer function processing chain 122 includes a series of characteristic processing atoms 122(0) through 122(J) (generally identified by reference numeral 122(j)), including an atom 122(0) for performing an image resize/zoom operation, an atom 122(1) for performing a noise reduction operation, an atom 122(2) for performing a sharpening operation, an atom 122(3) for performing a compression operation, and an atom 122(J) for performing a processing operation corresponding to the processing performed by the particular downstream utilization element 12 in, for example, rendering the image. Specific operations performed by the atoms 122(1) through 122(J) in connection with one embodiment will be described below. It will be appreciated that the order of atoms 122(0), 122(1), 122(2), and 122(3) in the chain 122 corresponds to the order that image resizing/zoom, noise reduction, sharpening and compression would be performed by the image data processing section in the molecules 32(0), 33(0), and 35(0) as described above. In addition, the atom 122(J), relating to the downstream utilization element 12, is positioned last since the downstream utilization element 12 is clearly the last processing performed in connection with image data prior to it being, for example, rendered. Additional atoms, represented by atom 122(J-1) are depicted to represent the possibility that, for example, parameters may be required by selected special effects molecules 34(1) in the special effects molecule class 34, or other atoms which may be provided in molecules 32(0), 33(0) and 34(0) that are not shown in FIGS. 6 through 8.

The Wiener noise spectrum processing chain 123 includes atoms 123(0) through 123(J) for performing corresponding image resize/zoom, noise reduction, sharpening, compression, and so forth, operations in connection with the Wiener noise spectrum information. Although the atoms 123(0) through 123(J) in the Wiener noise spectrum processing chain 123 perform operations corresponding to those performed by the atoms 122(0) through 122(J) in the modulation transfer function processing chain 122, the specific operations performed by the atoms 123(0) through 123(J) need not be the same as the specific operations performed by the atoms 122(0) through 122(J). A specific illustration of operations performed by atoms 123(0) through 123(J) of the Wiener noise spectrum processing chain will also be described below.

The characteristic processing section 21 further includes an image quality function value determination element 124 and a parameter optimization element 125, both of which are depicted on FIG. 9, and which correspond to the image quality value generator 21B and the parameter optimizer 21C (FIG. 2), respectively. As described above, the characteristic processing section 21 processes the modulation transfer function and Wiener noise spectrum information related to the specific image data source 11 and downstream utilization element 12 which, for example, acquire and render the image, to generate the image processing parameter data to be used by the image data processing section 20. In doing so, the atoms 122(j) comprising the modulation transfer function chain 122 and the atoms 123(j) comprising the Wiener noise spectrum chain 123 generally process the modulation transfer function and Wiener noise spectrum information using parameters provided by the parameter optimization element 125 to generate information which is used by the image quality function value determination element 124 to generate a single image quality function value (or objective metric) that is representative of the quality of the image to be, for example, rendered by the downstream utilization element 12. The parameter optimization element 125 receives the image quality function value and, using the values of the various parameters as were provided to the modulation transfer function chain 122 and the Wiener noise spectrum chain 123, generates updated parameter values. The modulation transfer function chain 122 and Wiener noise spectrum chain 123 repeat their operations using the updated parameter values to generate updated information to be provided to the image quality function determination element 124. In response to the updated information from the modulation transfer function chain 122 and Wiener noise spectrum chain 123, the image quality function determination element 124 generates an updated image quality function value to be used by the parameter optimization element 125 in generating yet another set of parameter values which may be provided to the chains 122 and 123. These operations are repeated through a series of iterations until the parameter optimization element 125 determines that the parameter values that it generates during an iteration meet a predetermined iteration termination criterion, in which case the iterations are stopped and the parameter optimization element provides the values of the parameters so determined to the image data processing section 20 as the image processing parameter data. In one embodiment, the initial set of parameter values provided by the parameter optimization element 125 to the modulation transfer function chain 122 and Wiener noise spectrum chain 123 are generated as random values, and the optimization element determines whether the termination criterion has been met by determining whether the parameter values generated during a given iteration are within a selected tolerance range of the values of corresponding parameters used during a previous iteration.

The specific operations performed by the atoms 122(j) and 123(j) comprising the chains 122 and 123 in connection with the modulation transfer function, the Wiener noise spectrum and the values of the parameters provided by the parameter optimization element 125 will, as indicated above, be determined generally by the operations performed by the corresponding atoms of the selected molecules 32(j), 33(k), 34(l) and 35(m) in the image data processing section 20. The modulation transfer function and Wiener noise spectrum provided to the chains 122 and 123 are effectively in DCT coefficient value form, effectively comprising matrices of values for the various frequencies $f_i$ used in generating the modulation transfer function and Wiener noise spectrum; thus, the modulation transfer function matrix is represented herein by $M(f_i)$ and following established practice the one dimensional slice through the two dimensional Wiener spectrum matrix $W(f_i, 0)$ is represented as $W(f_i)$.

The image resize/zoom atoms 122(0) and 123(0) generate zoomed modulation transfer function and Wiener noise spectrum values, respectively, representing the modulation transfer function and Wiener noise spectrum of a resized or zoomed image in response to a zoom factor Z, and the input modulation transfer function $M(f_i)$ and Wiener noise spectrum $W(f_i)$ provided to the characteristic processing section 21, as $$M_Z(f_i) = M(f_i * Z) \quad (4)$$

$$W_Z(f_i) = W(f_i * Z) * Z^2 \quad (5)$$

for each frequency component $f_i$. The value of the zoom factor Z may be provided by the operator as part of the user selection information, or it may in addition be a function of the sizes of the pixels (picture elements) of the image data source and the downstream utilization element.

The noise reduction atoms 122(1) and 123(1) generate noise-reduced modulation transfer function and Wiener noise spectrum values $M'(f_i)$ and $W'(f_i)$ in response to the zoomed modulation transfer function $M_Z(f_i)$ and Wiener noise spectrum $W_Z(f_i)$ provided thereto as follows:

$$M'(f_i) = N_M(\alpha, \beta, M(f_i), W(f_i)) * M_Z(f_i) \quad (6)$$

and $$W'(f_i) = N_W(\alpha, \beta) * W_Z(f_i) \quad (7)$$

where $N_M(\alpha, \beta, M(f_i), W(f_i))$ is a function of parameters $\alpha$ and $\beta$, as well as the modulation transfer function $M(f_i)$ and Wiener noise spectrum $W(f_i)$ as provided to noise reduction atom 123(1) of the modulation transfer function processing chain 122, and $N_W(\alpha, \beta)$ is a function of parameters $\alpha$ and $\beta$ as well as the Wiener noise spectrum $W(f_i)$ as provided to the noise reduction atom 123(1) of the Wiener noise spectrum processing chain 123. The parameters $\alpha$ and $\beta$, in one embodiment, are discussed below.

In one embodiment, the noise reduction atom 123(1) of the Wiener noise spectrum processing chain 123 is modeled as a generalized Wiener noise filter. Generally, a signal $C(f_i)$ input to a Wiener noise filter includes both desired signal components $S(f_i)$ and noise components $N(f_i)$, or $C(f_i) = S(f_i) + N(f_i)$. A generalized Wiener noise filter generates an output $C'(f_i)$ for each frequency $f_i$ according to $$C'(f_i) = \left( \frac{1}{1 + \alpha \frac{W(f_i)}{C^2(f_i)}} \right)^\beta C(f_i) \quad (8)$$

For a uniform image, the desired signal component of the input signal has a zero value, and so the entire input signal is represented by the noise component, that is, $C(f_i) = N(f_i)$. Accordingly, from equation (8), $$W'(f_i) = \epsilon \left[ \left[ \left[ \frac{1}{1 + \alpha \frac{W(f_i)}{N^2(f_i)}} \right]^\beta N(f_i) \right]^2 \right] \quad (9)$$

(where $\epsilon$ refers to the expectation value function) since the noise, represented by $N(f_i)$ is presumed to be random. To generate the noise-reduced Wiener noise spectrum $W(f_i)$, the expectation value is generated by generating a Wiener noise spectrum noise reduction factor $\text{nrf}_W(\alpha,\beta)$ based on equation (9), by using a new randomly-distributed variable $$\xi = \frac{N(f_i)}{\sqrt{W(f_i)}},$$

which has a mean value of zero and a variance of one. In that case, the Wiener noise spectrum noise reduction factor corresponds to $$nrf_W(\alpha, \beta) = \epsilon\left[\left(\left(\frac{1}{1+\frac{\alpha}{2\xi^2}}\right)^\beta \xi\right)^2\right] \quad (10)$$

accordingly, for discrete values of $\xi$, $$nrf_W(f_i) = \frac{2\delta\xi}{\sqrt{\pi}} \sum_{j=0}^{\infty} \left(2e^{-\xi_j^2}\left(\frac{1}{1+\frac{\alpha}{2\xi_j^2}}\right)^\beta \xi_j^2\right) \quad (11)$$

where $\xi_j = j\delta\xi$, where $\delta\xi$ is the sampling interval. In one embodiment, at high levels of noise reduction the actual amount of residual noise that is observed is somewhat higher than that which would be present if the noise reduction factor $\text{nrf}_W(f_i)$ from equation (11) were used directly as the $N_W(\alpha,\beta,W(f_i))$ in equation (7) directly; to accommodate the difference the noise-reduced Wiener noise spectrum is modeled as $$W'(f_i) = [0.996 * nrf_W(\alpha,\beta) + 0.011 e^{-12.2*nrf_W(\alpha,\beta)}]W(f_i) \quad (12)$$

so that $N_W(\alpha,\beta)$ in equation (7) corresponds to $$N_W(\alpha,\beta,W(f_i)) = 0.996 * nrf_W(\alpha,\beta) + 0.011 * e^{-12.2 nrf_W(\alpha,\beta)}$$

It will be appreciated that, at high levels of noise reduction, where $\text{nrf}_W(\alpha,\beta)$ is relatively low, the value of $N_W(\alpha,\beta)$ approaches the value "0.011," whereas as the value of the noise reduction factor increases, the value of $N_W(\alpha,\beta)$ approaches $0.996 * \text{nrf}_W(\alpha,\beta)$.

In determining the expression for $N_M(\alpha,\beta,M(f_i), W(f_i))$ for calculating the noise-reduced modulation transfer function $M(f_i)$ in equation (6), the modulation transfer function can be determined from the expected value of the ratio of the expectation value of the noise-reduced signal amplitude $C(f_i)$ as processed by the noise reduction atom 122(1) to the expectation value of the input signal amplitude $C(f_i)$, or $$N_M(\alpha, \beta, M(f_i), W(f_i)) = \frac{\epsilon[C'(f_i)]}{\epsilon[C(f_i)]} \quad (13)$$

for each frequency $f_i$. Generally, the average spectral signal amplitude distribution for real-world images $S_W(f_i)$ corresponds to $\epsilon[S_W(f_i)] = S_O/f_i$, where $S_O$ is related to the variance of the signal amplitude over the image. From the definition of the modulation transfer function for an image acquisition system as described above, the expectation value $\epsilon[S_i(f_i)]$ for the signal amplitude of an image as acquired by the image acquisition system corresponds to $$\epsilon[S_i(f_i)] = \frac{M(f_i)S_0}{f_i} \quad (14)$$

If both the signal and the noise are independent random variables with mean values of zero, then the sum $C(f_i)$ is also random with a zero mean value and a variance $$\sigma^2 = \left[\frac{M(f_i)S_0}{f_i}\right]^2 + W(f_i),$$

and has a probability distribution function of $$p(C(f_i)) = \frac{1}{\sqrt{2\pi}\left[\left(\frac{M(f_i)S_0}{f_i}\right)^2 + W(f_i)\right]^{\frac{1}{2}}} \times e^{-\left(\frac{[C(f_i)]^2}{2\left[\left(\frac{M(f_i)S_0}{f_i}\right)^2 + W(f_i)\right]}\right)} \quad (15)$$

If in equation (15), a substitution is made in which the exponent $$\frac{[C(f_i)]}{\sqrt{2}\left[\left(\frac{M(f_i)S_0}{f_i}\right)^2 + W(f_i)\right]^{1/2}}$$

is replaced by the variable $\lambda$, then equation (8) and equation (13) combine to form $$N_M(\alpha, \beta, M(f_i), W(f_i)) = \quad (16)$$

$$\frac{\epsilon\left[\left(\frac{\lambda^2}{\lambda^2 + \frac{\alpha W(f_i)}{2\left[\left(\frac{M(f_i)S_0}{f_i}\right)^2 + W(f_i)\right]}}\right)^\beta \lambda\right]}{\epsilon[\lambda]}$$

or $$N_M(\alpha, \beta, M(f_i), W(f_i)) = \quad (17)$$

$$\frac{\sum_{j=0}^{\infty} e^{-\lambda_j^2}\left[\frac{\lambda_j^2}{\lambda_j^2 + \frac{\alpha}{2\left[\left(\frac{M(f_i)S_0}{f_i}\right)^2 + W(f_i)\right]}}\right]^\beta \lambda_j}{\sum_{j=0}^{\infty} e^{-\lambda_j^2}\lambda_j}$$

where $\lambda_j = j*\delta\lambda$. The noise reduction atom 122(1) uses the values for $N_M(\alpha,\beta, M(f_i), W(f_i))$ for each frequency $f_i$ along with equation (13) in generating the noise-reduced modulation transfer function $M'(f_i)$.

The sharpening atoms 122(2) and 123(2) perform sharpening in connection with the values of the various values of noise-reduced modulation transfer function matrix $M(f_i)$ and noise-reduced Wiener noise spectrum matrix $W(f_i)$ provided thereto using a sharpening matrix $K(f_i)$ as follows:

$$M''(f_i) = K(f_i)M'(f_i) \quad (18)$$

for the sharpening atom 122(2) of the modulation transfer function chain 122, and $$W''(f_i) = [K(f_i)]^2 W'(f_i) \quad (19)$$

for the sharpening atom 123(2) of the Wiener noise spectrum chain 123. In one embodiment, the elements of the sharpening matrix $K(f_i)$ are determined according to:

$$K(f_i) = \gamma \left[ \frac{1 - \sin(\pi\Delta\delta f_i)}{\pi\Delta\delta f_i} \right] + 1 \qquad (20)$$

with $\gamma$ and $\Delta$ being parameters and $\delta$ representing the width of a pixel. It will be apparent from both equations (18) and (19) that, in performing the multiplications of the sharpening matrix $K(f_i)$ with the noise-reduced modulation transfer function matrix $M(f_i)$ and the noise-reduced Wiener noise spectrum matrix $W(f_i)$, corresponding elements of the respective matrices are multiplied. It will be appreciated that the sharpening matrix $K(f_i)$ in equation (20) will generally serve to increase the values of the matrix elements of matrices $M(f_i)$ and $W(f_i)$ relating to the higher-frequency modulation transfer function and Wiener noise spectrum components, with the degree of increase being a somewhat complex function of the parameters $\gamma$ and $\Delta$. The sharpening atom 122(2) of the modulation transfer function chain 122 generates a matrix $M(f_i)$ in accordance with equations (18) and (20), and sharpening atom 123(2) of the Wiener noise spectrum chain 123 generates a matrix $W(f_i)$ in accordance with equations (19) and (20), which the atoms provide to respective compression atoms 122(3) and 123(3).

As described above in connection with FIG. 8, the JPEG compression molecule 35(m) effectively performs compression using both quantization and Huffman encoding. Since Huffman encoding effectively results in no loss of image information, but quantization can result in loss of image information, the compression atoms 122(3) and 123(3) perform processing only in connection with the quantization portion of compression, effectively generating quantized modulation transfer function and Wiener noise spectrum values as follows:

$$M(f_i)_q = L_M(f_i, \Delta_q(f_i)) M''(f_i) \qquad (21)$$

$$W(f_i)_q = L_W(f_i, \Delta_q(f_i)) W''(f_i) \qquad (22)$$

where $L_M(f_i, \Delta_q(f_i))$ and $L_W(f_i, \Delta_q(f_i))$, which are functions of both frequency $f_i$ and a scaled quantization interval $\Delta_q(f_i)$ as described below, represent quantization factors used by the compression atoms 122(3) and 123(3) in quantizing the noise-reduced sharpened modulation transfer function value $M''(f_i)$ and Wiener noise spectrum value $W''(f_i)$, respectively. In performing compression in relation to the JPEG standard, the compression atoms 122(3) and 123(3) use a scaled quantization mask $Q(f_i)$ that defines the intervals between quantized values for each of the different frequencies $f_i$, and that is derived from a contrast sensitivity function that describes sensitivity of the eye to detail. The compression atoms 122(3) and 123(3) scale the quantization intervals in relation to a scaling factor. Thus, for any particular frequency $f_i$, the scaled quantization interval is given by:

$$\Delta_q(f_i) = S \ast Q(f_i) \qquad (23)$$

where S is the quantization scaling factor, and is one of the parameters provided by the characteristic processing section 21.

The variance of $x_q$ is determined to be related to the variance of $x$ by:

$$\sigma_q^2 = \sigma^2 \left[ 1 + \left( .276 \frac{\Delta_q}{\sigma} \right)^{1.355} \right]^2 e^{-.5\left(\frac{\Delta_q}{3\sigma}\right)} \qquad (24)$$

where $\Delta_q$ is the effective quantization interval.

Generally, the values of the signal power spectrum $S_i(f_i)$ and the noise power spectrum $W(f_i)$ represent variances of random variables. Accordingly, since the quantized modulation transfer function is determined from the ratio of the signal power after quantization to the unquantized signal power, from equation (24) the quantized modulation transfer function $M(f_i)_q$ corresponds to $$M(f_i)_q = \qquad (25)$$

$$\left[ \left[ 1 + \left( .276 \frac{\Delta_q}{\sqrt{S_i(f_i)}} \right)^{1.355} \right]^2 e^{-0.5\left(\frac{\Delta_q}{3\sqrt{S_i(f_i)}}\right)} \right]^{\frac{1}{2}} M''(f_i)$$

where $$S_i(f_i) = \left[ \frac{M(f_i) S_0}{f_i} \right]^2 \qquad (26)$$

represents the expectation value of the signal power of the image (reference equation (14) above) and where $\Delta_q$ corresponds to the quantization interval as given by equation (23). Similarly, the quantized Wiener noise spectrum value is given by $$W(f_i)_q = \left[ \left[ 1 + \left( .276 \frac{\Delta_q}{\sqrt{W(f_i)}} \right)^{1.355} \right]^2 e^{-0.5\left(\frac{\Delta_q}{3\sqrt{W(f_i)}}\right)} \right] W''(f_i) \qquad (27)$$

For the frequency component $f_i$ corresponding to zero, then the value of the quantized modulation transfer function $M(f_i)_q$ has the value "one," and the value of the quantized Wiener noise spectrum $W(0)_q$ is given by $$W(0)_q = \left[ 1 + \left( .276 \frac{\Delta_q}{8\sqrt{W(0)}} \right)^{1.355} \right] W''(0) \qquad (28)$$

The downstream utilization element atoms 122(J) and 123(J) of the modulation transfer function processing chain 122 and the Wiener noise spectrum processing chain 123, respectively, process the modulation transfer function and Wiener noise spectrum provided thereto by respective upstream atoms 122(J−1) and 123(J−1) in relation to the downstream utilization element modulation transfer function information and downstream utilization element Wiener noise spectrum information provided thereto which characterizes the downstream utilization element 12. In the illustrative embodiment, in which the user selection information enables molecule 33(0) to be selected in the image integrity molecule class 33 and JPEG compression molecule 35(0) to be selected in the compression molecule, the user selection information will also enable the atoms 122(J) and 123(J) to follow immediately respective compression atoms 122(3) and 123(3) in the processing chains 122 and 123. Accordingly, the downstream utilization element processing atoms 122(J) and 123(J) will receive quantized, sharpened, and noise-reduced modulation transfer function and Wiener noise spectrum values $M(f_i)_q$ (equation (25)) and $W(f_i)_q$ (equation (27)) and process them in relation to the modulation transfer function and Wiener noise spectrum, respectively, for the downstream utilization element 12.

It will be appreciated that, if the downstream utilization element 12 is characterized by a modulation transfer function and a Wiener noise spectrum represented by $M_{DOWN}(f_i)$ and $W_{DOWN}(f_i)$, respectively, it would, for example, in rendering an image, process the image information that is provided thereto, by multiplying the modulation transfer function of the image by the modulation transfer function characterizing the downstream utilization device 12, and by adding the Wiener noise spectrum characterizing the image to the Wiener noise spectrum characterizing the downstream utilization device 12. That is, if the image information as input to the downstream utilization element 12 is characterized by the modulation transfer function $M_{IM}(f_i)$ and Wiener noise spectrum $W_{IM}(f_i)$, the rendered image would effectively be characterized by $M_{DOWN}(f_i)*M_{IM}(f_i)$, where * represents the multiplication operation, and $W_{DOWN}(f_i)+ W_{IM}(f_i)$. Accordingly, since in the illustrative embodiment described above the processed image data coupled to the downstream utilization element is effectively represented by the quantized sharpened noise-reduced modulation transfer function and Wiener noise spectrum $M(f_i)_q$ and $W(f_i)_q$, respectively, the modulation transfer function downstream utilization element atom 122(J) generates a processed modulation transfer function output $M'(f_i)_q$ as $$M'(f_i)_q = M_{DOWN}(f_i)*M(f_i)_q \qquad (29)$$

and the Wiener noise spectrum downstream utilization element atom 123(j) generates the Wiener noise spectrum downstream utilization element value as $$W'(f_i)_q = W_{DOWN}(f_i) + W(f_i)_q \qquad (30)$$

If the modulation transfer function $M_{DOWN}(f_i)$ and Wiener noise spectrum $W_{DOWN}(f_i)$ of the downstream utilization element 12 are not specified, in one embodiment it is assumed that they have the values one and zero respectively; essentially, it is assumed that the downstream utilization element 12 does not affect the modulation transfer function input thereto and that it is noiseless; that is, that it would transmit the image input thereto substantially unchanged. The $M'(f_i)_q$ and $W'(f_i)_q$ values generated by the downstream utilization element atoms 122(J) and 123(J) represent the outputs of the modulation transfer function processing chain 122 and Wiener noise spectrum processing chain, respectively, and effectively represent the processing of image data in response to the particular preliminary parameter values as provided by the parameter optimization element 125 during the iteration, and further in response to processing that would be performed by the downstream utilization element 12 in, for example, rendering the image.

As described above, the atoms 122(J) and 123(J) couple the $M'(f_i)_q$ and $W'(f_i)_q$ values to the image quality function determination element 124, which processes the values to generate a single image quality function value, which is then used by the parameter optimization element 125 in updating the parameter values to be used by the modulation transfer function processing chain 122 and Wiener noise spectrum processing chain 123 in a subsequent iteration. In one embodiment, the image quality function value determination element 124 generates a single image quality function value in response to two components, namely, a sharpness component which reflects the sharpness of the rendered image as characterized by the modulation transfer function information $M'(f_i)_q$ and a graininess component which reflects the graininess of the rendered image characterized by the Wiener noise spectrum information $W'(f_i)_q$. For both components, the image quality function determination element 124 uses a spectral weighting factor $\omega(f_i)$ defined as $$\omega(f_i) = \frac{E(f_i)}{f_i} \qquad (31)$$

where $E(f_i)$ is the spectral response of the eye (or other visual system) for an image at a selected viewing distance. Sharpness of an image for a given frequency component $f_i$ is a function of the value of the modulation transfer function and spectral weighting factor $\omega(f_i)$ for that frequency component, and an objective measure of the sharpness is defined as the integral of the multiplicative product over the frequency range, normalized by the integral of the spectral weighting factor $\omega(f_i)$ over the same frequency range. Accordingly, in one embodiment, the image quality function determination element generates a sharpness quality value SQV or SQF in response to the modulation transfer function $M'(f_i)_q$ and spectral weighting factor as $$SQV = \eta_s \left( \frac{\int_0^{f_N} \omega(f_i) M'(f_i)_q d(f_i)}{\int_0^{f_N} \omega(f_i) d(f_i)} \right) \qquad (32)$$

where $\eta_s$ is an arbitrary proportionality constant which, in one embodiment is selected to be one hundred. The integrals in equation (32) are taken over the frequency range from zero to the Nyquist frequency $f_N$. In one embodiment, the image quality function determination element 124 approximates the integrals of equation (32) using the well-known Simpson's approximation rule, and in that embodiment it generates the sharpness quality factor value as $$SQV \approx \eta_s \left( \frac{\sum_{f_i=f_1}^{f_N} [\omega(f_i) M'(f_i)_q + \omega(f_{i-1}) M'(f_{i-1})_q]}{\sum_{f_i=f_1}^{f_N} [\omega(f_i) + \omega(f_{i-1})]} \right) \qquad (33)$$

where $f_i$ is the lowest non-zero frequency component in the series of frequency components $f_i$. The image quality function determination element 124, using the sharpness quality factor value it generates using equation (32), or the approximation it generates using equation (33), generates a sharpness quality metric $Q_s$ to be used in the quality function determination as $$Q_s = \alpha_s SQV + \beta_s \qquad (34)$$

where $\alpha_s$ and $\beta_s$ are constants whose values are determined experimentally; in one embodiment the values of constants $\alpha_s$ and $\beta_s$ have been experimentally determined to be 2.068 and $-38.66$, respectively.

As described above, the Wiener noise spectrum relates to the graininess of the image, either as acquired or as rendered, and so the image quality function determination element 124 uses the Wiener noise spectrum value $W'(f_i)_q$ generated by the Wiener noise spectrum processing chain 123 in generating a graininess factor G. Graininess of an image for a given frequency component $f_i$ is a function of the value of the Wiener noise spectrum and the square of the spectral weighting factor $\omega(f_i)$ for that frequency component, and an objective measure of the graininess is defined as the integral of the multiplicative product over the frequency range, normalized by the integral of the square of the spectral weighting factor $\omega(f_i)$ over the same frequency range. Accordingly, in one embodiment, the image quality function determination element 124 generates a graininess value G in response to the Wiener noise spectrum $W'(f_i)_q$ and spectral weighting factor as $$G = \left( \frac{\int_0^{f_N} \omega^2(f_i) W'(f_i)_q d(f_i)}{\int_0^{f_N} \omega^2(f_i) d(f_i)} \right) \qquad (35)$$

The integrals in equation (35) are taken over the frequency range from zero to the Nyquist frequency $f_N$. In one embodiment, the image quality function determination element 124 approximates the integrals of equation (35) using the Simpson's approximation rule, and in that embodiment it generates the graininess value as $$G \approx \left( \frac{\sum_{f_i=f_1}^{f_N} [\omega^2(f_i)W'(f_i)_q + \omega^2(f_{i-1})W'(f_{i-1})_q]}{\sum_{f_i=f_1}^{f_N} [\omega^2(f_i) + \omega^2(f_{i-1})]} \right) \quad (36)$$

The image quality function determination element 124, using the graininess value that it generates using equation (35), or the approximation it generates using equation (36), generates a graininess metric $Q_G$ to be used in the quality function determination as $$Q_G = \alpha_G \log_{10} G + \beta_G \quad (37)$$

where $\alpha_G$ and $\beta_G$ are constants whose values are experimentally determined; in one embodiment the values of constants $\alpha_G$ and $\beta_G$ have been experimentally determined to be −75.07 and 104.5 respectively.

The image quality function determination element 124 uses the sharpness metric $Q_S$ and graininess metric $Q_G$ to generate an image quality metric value $IM_Q$ using the image quality function $$IM_Q = \frac{1}{\sqrt[n]{\left(\frac{1}{Q_S}\right)^n + \left(\frac{1}{Q_G}\right)^n + \left(\frac{1}{Q_{CEIL}}\right)^n}} \quad (38)$$

$$\left(\frac{1}{Q_{CEIL}}\right)^n$$

Ignoring for the moment the addend in equation (38), the image quality function as set forth in equation (38) is selected so that, if one of the sharpness metric $Q_S$ or the graininess metric $Q_G$ has a relatively large value and the other has a relatively small value, the metric with the relatively small value will generally control the image quality value $IM_Q$. On the other hand, if the sharpness metric $Q_S$ and the graininess metric $Q_G$ have approximately the same value, the image quality value $IM_Q$ will have a value which strongly depends on the values of both metrics.

$$\left(\frac{1}{Q_{CEIL}}\right)^n$$

The addend is provided in equation (38) to reflect the experimentally-observed fact that, at high quality levels, as reflected in high values for the sharpness metric $Q_S$ and the graininess metric $Q_G$, there is a leveling off of image quality as observed by an observer. In one embodiment, in which the metrics are generated as described above, with n having the value 2.5, the value of $Q_{CEIL}$, which provides a ceiling image quality value, is selected to have a value that minimizes least-square error in the image quality function value of the predicted image quality for a large number of psychovisual assessments of particular types of images, and in that embodiment has a value of 118 for certain classes of images, namely, those contained in photographic prints.

As noted above, the modulation transfer function and Wiener noise spectrum processing chains 122 and 123, image quality function determination element 124 and parameter optimization element 125 operate in a series of iterations, during each iteration the modulation transfer function and Wiener noise spectrum processing chains generating respective processed modulation transfer function and Wiener noise spectrum values $M'(f_i)_q$ and $W'(f_i)_q$ (equations (29) and (30)), in response to a set of trial parameters from the parameter optimization element 125, and the image quality function determination element 124 generating the image quality value $IM_q$ (equation (38)) in response to the processed modulation transfer function and Wiener noise spectrum values $M'(f_i)_q$ and $W'(f_i)_q$ generated by the processing chains 122 and 123. As noted above, the parameter optimization element 125, generates a set of values for the parameters α, β, γ, Δ, and S that maximize the image quality value $IM_q$. When it has identified the set of parameter values that provides that maximum image quality value $IM_q$, it has effectively determined the parameter values that will optimize image processing by the image data processing section 20, and so it provides those parameter values as the image processing parameter data to the image data processing section 20, for use by the noise reduction atoms 93 and 94 (parameters α and β), the sharpening atom 95 (parameters γ and Δ) and the quantization atom 112 (parameter S)

The parameter optimization element 125 may generate the desired set of parameter values using any of a number of well-known methodologies for locating an extremum, in particular, a maximum value, of a function. Several such methodologies are described in chapter 10 of W. Press, et al., *Numerical Recipes In Fortran* 2d ed. (Cambridge University Press, 1992), for example. In one embodiment, the parameter optimization element 125 operates in accordance with a modified downhill simplex methodology. The downhill simplex methodology, as described, for example, in the aforementioned Press book, at pp. 402–406 is a methodology which, for a particular function (in this case the image quality value $IM_q$) of a plurality N of variables (in this case the parameters α and β used by the noise reduction atoms 122(1) and 123(1), parameters γ and Δ used by the sharpening atoms 122(2) and 123(2) and parameter S used by the compression atoms 122(3) and 123(3)), enables the identification of an extremum (that is, the maximum or minimum value) of the function and the values of the variables which provide that extremum. In accordance with the downhill simplex methodology, the parameter optimization element 125 generates an initial simplex, which is represented as an N-dimensional geometric figure. Since the image quality value $IM_q$ is a function of the five parameters α, β, γ, Δ and S, the simplex associated with the image quality $IM_q$ will be represented as a five-dimensional figure (each dimension being associated with one of the variables, or parameters, α, β, γ, Δ, and S ) having six vertices (that is, N+1 vertices, where "N" is the number of independent variables), which may be selected initially at random. In the five-dimensional space, each vertex $V_i$ of the simplex is defined as the quintuple $(\alpha_i, \beta_i, \gamma_i, \Delta_i, S_i)$ with each vertex $V_i$ having an associated image quality function value $IM_{qi}$.

In accordance with the downhill simplex methodology, the parameter optimization element 125 will establish an initial set of six vertices defining the initial simplex, by selecting at random six different sets of values of the trial parameters $\alpha_i, \beta_i, \gamma_i, \Delta_i$, and $S_i$ (i being an integer from 1 to 6) to represent six vertices $V_i$ defining the simplex, and, for each set i, enabling the modulation transfer function and Wiener noise spectrum processing chains 122 and 123 and the image quality function determination element 124 to generate the image quality value $IM_{qi}$ as described above. After image quality values $IM_{qi}$ have been generated for all six of the initial sets of parameters $\alpha_i, \beta_i, \gamma_i, \Delta_i$, and $S_i$, (i being an index from 1 to 6), the parameter optimization element 125 generates a new set of parameters $\alpha_7, \beta_7, \gamma_7, \Delta_7$, and $S_7$, representing a new vertex $V_7$ for the simplex to be substituted for the vertex $V_i$ represented by one of the six original sets $\alpha_i, \beta_i, \gamma_i, \Delta_i$, and $S_i$, namely, the vertex $V_I$ which gave rise to the lowest value for the image quality function $IM_{qi}$. In generating the new vertex $V_7$, the parameter optimization element 125 performs one of a number of operations in connection with the selected vertex $V_I$, to try to obtain a new vertex whose parameter values $\alpha_7, \beta_7, \gamma_7, \Delta_7$, and $S_7$ provide an image quality value $IM_{q7}$ which is better than the image quality value $IM_{qI}$ associated with the vertex $V_i$. The parameter optimization element 125 can perform a number of types of operations in connection with the simplex including (a) reflecting the selected vertex $V_i$ through the opposite face of the simplex, while preserving its volume, (b) reflection of the selected vertex $V_i$ and expansion or contraction in a direction orthogonal to the opposite face, and (c) contraction of one or more faces.

In generating the new vertex $V_7$, the parameter optimization element 125 will, using the above-described operations, generate a new trial vertex $V_7^T$ comprising a set of trial parameter values $\alpha_7^T, \beta_7^T, \gamma_7^T, \Delta_7^T$, and $S_7^T$ which the parameter optimization element 125 provides to the modulation transfer function and Wiener noise spectrum processing chains 122 and 123 and image quality function determination element 124 to generate a trial image quality value $IM_{q7}^T$. If the trial image quality value $IM_{q7}^T$ is higher than at least the second lowest trial image quality value $IM_{qi}$, the parameter optimization element 125 will use the trial vertex $V_7^T$ associated with the trial image quality value $IM_{q7}^T$ as the new vertex $V_7$ for the simplex. Otherwise, if the trial image quality value $IM_{q7}^T$ generated in response to the new trial vertex $V_7^T$ is not higher than at least the second lowest trial image quality value $IM_{qi}$, it will perform others of the selected operations, described above, or combinations thereof, in connection with the selected vertex $V_I$, to find another new trial vertex $V_7^T$ and repeat these operations. The parameter optimization element 125 will repeat these operations until it identifies a trial vertex $V_7^T$ for which the trial image quality value $IM_{q7}^T$ whose value is higher than at least the second lowest trial image quality value $IM_{qi}$, and will use that trial vertex $V_7^T$ as the new vertex $V_7$.

The parameter optimization element 125 will repeat the above-described operations through a series of iterations, during each iteration generating a new vertex $V_i$ (i being an index greater than 7) to replace the vertex associated with the lowest image quality value $IM_q$. The iterations will be continued until a selected termination criterion is satisfied. In one embodiment, the parameter optimization element 125 will preferably terminate when the highest image quality values $IM_{qi}$ for at least some of the vertices defining the simplex are within a selected tolerance value. In addition, it will be appreciated that a predetermined maximum number of iterations may be specified for the parameter optimization element 125, and the parameter optimization element 125 may terminate after it performs the predetermined maximum number of iterations, if the previously-described preferred termination criterion has not been satisfied. After the parameter optimization element 125 has terminated processing, at least in connection with the first termination criterion, it will provide the values of the parameters associated with the highest image quality value $IM_q$ to the image data processing section 20 for use in processing the image data as described above. (The second termination criterion, based on a selected maximum number of iterations, may be provided to accommodate, for example, error conditions or conditions in which no maximum image quality value $IM_q$ can be determined, and if iterations terminate in response to that criterion the parameter optimization element 125 may provide the values of the parameters associated with the vertex $V_i$ having the highest image quality value $IM_q$ to the image data processing section 20. Alternatively, the parameter optimization element 125 may repeat the downhill simplex methodology using a new simplex with new randomnly-generated vertices.)

In one specific embodiment, the values of the various parameters $\alpha, \beta, \gamma, \Delta$ and $S$ are limited to predetermined ranges. In that embodiment, if, in locating a trial vertex $V_i^T$ the trial value of one or more of the parameters specifying the trial vertex is outside the parameter's range, the parameter optimization element 125 provides a penalty function which effectively reduces the trial image quality value associated with the trial vertex, with the penalty function being proportional to the extent to which the parameter's value is outside its predetermined range. As an alternative, in generating the trial vertices $V_i^T$, the parameter optimization element 125 may be limited to vertices which are within the various parameters' predetermined ranges.

As described above, the modulation transfer function processing chain 122 and the Wiener noise spectrum processing chain 123 are provided to process image data source and downstream utilization element characteristic data that effectively define the processing performed by the image data source 11 and, for example, rendered by the downstream utilization element 12, in a manner corresponding to the way in which the actual image data would be processed by the molecules of the image data processing section 20. Accordingly, the specific set of atoms which would be provided in the modulation transfer function and Wiener noise spectrum processing chains 122 and 123 will correspond to the specific set of molecules $32(j), 33(k), 34(l)$ and $35(m)$ from the various molecule classes 32–35, as well as the specific atoms in the respective molecules which are enabled. In addition, atoms may be provided in the modulation transfer function and Wiener noise spectrum processing chains 122 and 123, that are related to specific processing operations as specified by the virtual observer, but for which parameters are not to be generated. Generally, the atoms of the modulation transfer function and Wiener noise spectrum processing chains 122 and 123 will correspond to enabled atoms of the selected molecules $32(j), 33(k), 34(l)$ and $35(m)$ which perform spatial processing in connection with the image data.

In addition, it will be appreciated that a number of variations may be made in connection with the specific image quality value $IM_q$ as provided by the image quality function determination element 124. For example, the image quality function determination element 124 may, in addition to providing the image quality value $IM_q$ as described above in connection with equation (38), or as an alternative to providing such an image quality value, provide an image quality $IM_q$ value which reflects selected characteristics of the image data source 11 and downstream utilization element 12. As an illustration, the image quality function determination element 124 may generate, in response to the image quality value $IM_q$ as described above, a color-balance corrected image quality value $IM_{CB}$ which, in one embodiment, is selected as $$IM_{CB} = IM_q e^{-(\frac{\Delta E}{E_0})^2} \quad (36)$$

where E represents the color reproduction error of the downstream utilization element, based on a sample image of uniform predetermined color, and $E_0$ is a scale factor, and provide it to the parameter optimization element 125. The color-balance corrected image quality value $IM_{CB}$ thus generated reflects the fact that the image quality of the, for example, rendered image as perceived by an observer is affected by the color balance of the image data as generated by the image data source 11 or the image as rendered by the downstream utilization element 12. Other modifications will be apparent to those skilled in the art.

Figure 10:
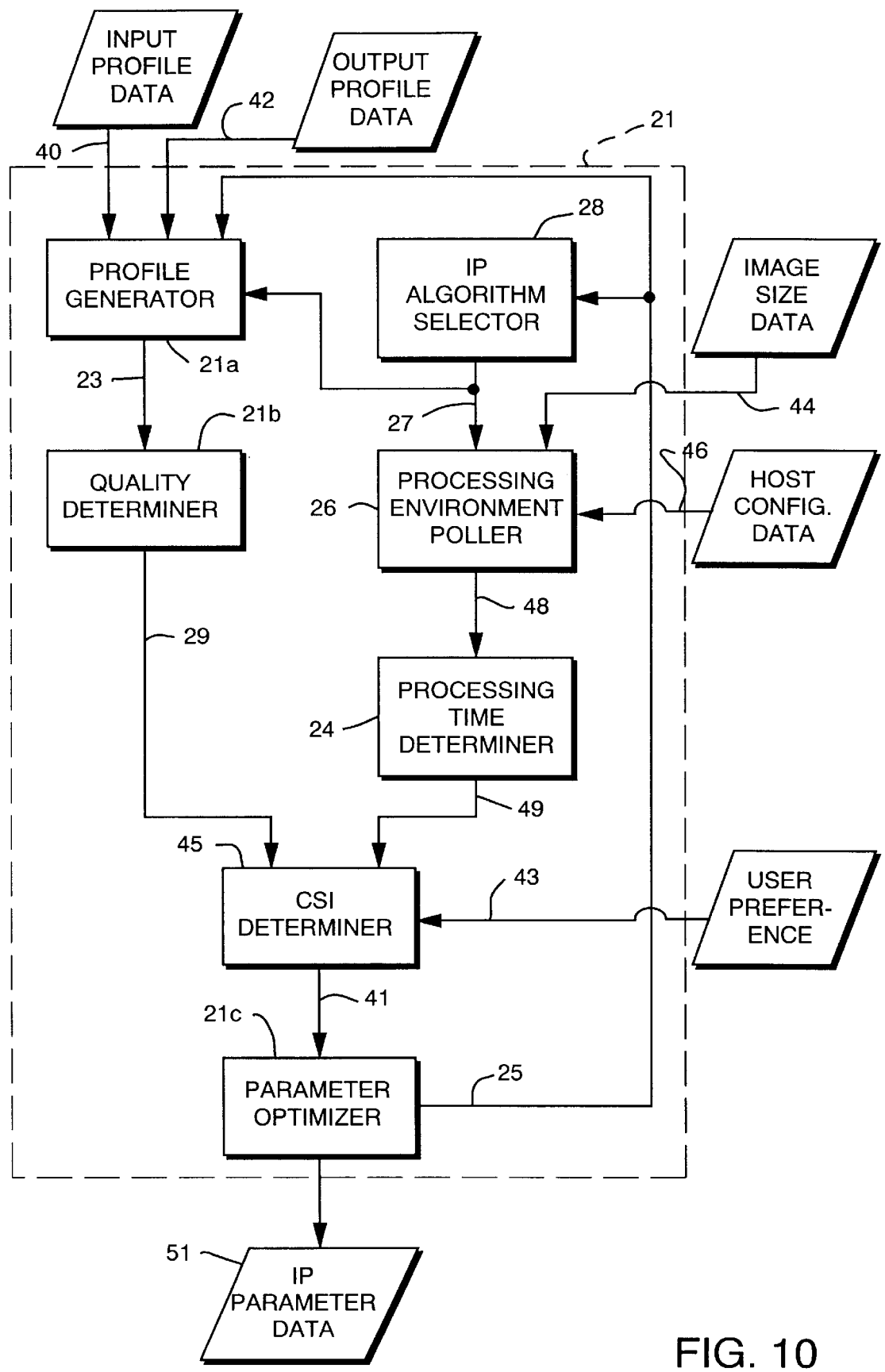
FIG. 10 is a second flow chart depicting operations performed by a characteristic processing section as depicted in FIG. 2.

The characteristic processing system 2 of FIG. 2 is further illustrated by the example of the flow chart of FIG. 10 which provides additional detail of the processing loop between the profile generator 21A and the parameter optimizer 21C. The loop in FIG. 10 is defined by the interaction of each of the elements 21A, 21B, 21C, 24, 26, 28 and 45. Here, the image size data 44, the host configuration data 46, the user selection information 43, the image source characteristic data 40 and the downstream device characteristic data 42 are all constant value inputs, whereas the data 27 corresponding to a particular sequence of image processing operations, the objective metrics 29 relating to the image quality, and the processing time 49 are continuously evolving and being fine tuned with each additional pass through the processing loop. Effectively, the IP algorithm selector 28 tries each possible sequence of image processing operations available within the system before the image processing parameter data 51 corresponding to an optimal CSI value is generated by the parameter optimizer 21C.

Upon system initiation, the source or upstream device characteristic data 40 resident in an input device profile 53, and the downstream device characteristic data 42 resident in an output device profile 55 are both sent to the profile generator 21A along with default parameters from the parameter optimizer 21C, and default data from the controller 21D corresponding to the predefined initial sequence of image processing operations The profile generator 21A then generates a set of reference values 23. The quality determiner or calculator 21B generates the objective metrics 29 in response to the set of reference values 23. The processing environment poller 26 generates polling data 48 in response to the default data 27 corresponding to the predefined initial sequence of image processing operations, the image size data 44 from the user selection information (or readable from the input image), and the host configuration data 46 received from the host computer. The polling data 26 represents the current operating conditions for the system. The image size data 44 refers specifically to the horizontal and vertical dimensions of the input image, given in the number of input pixels and the number of input color channels and bit depth or resolution of the same. The host configuration data 46 contains information about the central processing unit (CPU), its clock speed, the amount of random access memory (RAM) available to the software running on the system, disk speed if virtual memory is in use, etc. The processing time determiner 24 generates processing time data 49 in response to the polling data 48. The processing time data 49 is defined as the time the user has to wait for the image to be processed through each of the various combinations of processing sequences. Thereafter, the CSI determiner 45 generates CSI data 41 in response to the user selection data 43, the objective metrics 29 and the processing time data 49. The CSI, as previously defined, is the customer (i.e. operator) satisfaction index for various combinations of processing time versus image quality. As earlier noted, the perceived time quality of the image as well as the CSI can be varied by the user changing the user selection information 43 to balance the processing time versus the image quality. If the CSI data is not optimal, then in the parameter optimizer 21C the trial parameters 25 are generated and the image processing parameter data 51 is not generated. The profile generator 21A replaces the default trial parameters with the newly generated trial parameters 25 prior to generating a new set of reference values 23, and the IP algorithm selector 28 updates the default data from the controller 21D with a new sequence of image processing operations for generating updated data 27. Once the CSI data 41 becomes optimal, then the parameter optimizer 21C generates corresponding image processing parameter data 51 and no further feedback is provided within the processing loop.

The image processing system 10 provides a number of advantages. In particular, it facilitates the optimal processing of image data provided by a variety of types of image data sources and for use by a variety of types downstream utilization elements based on a sequence of image processing operations as selected by a virtual observer. The set of processing operations that are selected, as well as the order in which they are to be applied, affect the appearance of the image as rendered by the image data source.

It will be appreciated that the image processing system 10 may be implemented in special purpose hardware, or in a suitably programmed general purpose digital computer system. Alternatively selected portions of the image processing system may be implemented in special purpose hardware and other portions in a suitably programmed general purpose digital computer system. For example, a variety of integrated circuit chip manufacturers provide special-purpose processing circuits for processing image data in accordance with the aforementioned JPEG standard, and implementation of the image processing system using such circuits will be readily apparent to those skilled in the art. An illustrative circuit is, for example, a CW702 JPEG core provided by LSI Logic Corporation.

The foregoing description has been limited to specific embodiments of this invention. It will be apparent, however, that variations and modifications may be made to the invention, with the attainment of some or all of the advantages of the invention. It is the object of the appended claims to cover these and such other variations and modifications as come within the true spirit and scope of the invention.

We claim:

1. A digital image processing system to transform input image data representing an input image into processed image data representing a rendered image, said digital image processing system comprising:

means for automatically generating image processing parameter information corresponding to an optimized customer satisfaction index for evaluating an effect of a sequence of image processing operations on the input image data in response to image source characteristic data received from an input device profile, downstream device characteristic data received from an output device profile, host configuration data, user selection data, trial parameter values and data corresponding to said sequence of image processing operations, said effect evaluated in accordance with predetermined psychovisual attributes of the input image as attained and codified by human observers who have subjectively selected a most pleasing test image corresponding to objective metrics of said predetermined psychovisual attributes;

means for generating the processed image data by applying said image processing parameter information to the input image data; and means for generating the rendered image having said optimized customer satisfaction index in response to the processed image data.

2. The system as recited in claim 1, wherein said means for automatically generating image processing parameter information is defined as a virtual observer, and said customer satisfaction index is optimized by said virtual observer by a tradeoff between image quality and processing time.

3. The system as recited in claim 2, wherein said means for automatically generating image processing parameter information further comprises:

means for generating reference values in response to said image source characteristic data, said downstream device characteristic data, said trial parameter values and said data corresponding to a sequence of image processing operations;

means for generating said data corresponding to a sequence of image processing operations in response to said trial parameter values;

means for generating processing time data in response to image size data, said host configuration data, and said data corresponding to a sequence of image processing operations;

means for generating said objective metrics in response to said reference values;

means for generating customer satisfaction index data in response to said objective metrics and said processing time data; and means for generating both said trial parameters and said image processing parameter data in response to said customer satisfaction index data.

4. The system of claim 3, wherein said means for generating processing time data comprises:

means for generating polling data in response to said image size data, said host configuration data, and said data corresponding to a predefined sequence of image processing operations; and means for generating said processing time data in response to said polling data.

5. The system of claim 1, wherein said predetermined psychovisual attributes comprise sharpness, graininess, noise, luminance, color, tone and aspect ratio.

6. The system of claim 1, wherein the input image is represented by a multi-dimensional array of pixels, each pixel being associated with a corresponding point of the input image, the input image data comprising, for each said pixel, a digital data value defining an intensity of a corresponding point on the input image.

7. The system of claim 6 in which the digital data value for each said pixel further defines a color of said corresponding point on the input image.

8. An image processing method comprising the step of transforming input image data representing an input image into processed image data representing a rendered image comprising the steps of:

automatically generating image processing parameter information corresponding to an optimized customer satisfaction index for evaluating an effect of a sequence of image processing operations on input image in response to image source characteristic data received from an input device profile, downstream device characteristic data received from an output device profile, host configuration data user selection data, trial parameter values and data corresponding to said sequence of image processing operations, said effect evaluated in accordance with predetermined psychovisual attributes of the input image attained and codified by human observers who have subjectively selected a most pleasing test image corresponding to objective metrics of said predetermined psychovisual attributes;

generating the processed image data by applying said image processing parameter information to the input image data; and generating the rendered image having said optimized customer satisfaction index in response to the processed image data.

9. The method of claim 8, wherein said customer satisfaction index is determined tradeoff between image quality and processing time during said step of automatically generating image processing parameter information.

10. The method of claim 8, wherein the step of automatically generating image processing parameter information further comprises the steps of:

generating reference values in response to said image source characteristic data, said downstream device characteristic data, said trial parameter values and said data corresponding to a predefined sequence of image processing operations;

generating said data corresponding to a predefined sequence of image processing operations in response to said trial parameter values;

generating processing time data in response to image size data, said host configuration data, and said data corresponding to a predefined sequence of image processing operations;

generating said objective metrics in response to said reference values;

generating customer satisfaction index data in response to said objective metrics and said processing time data; and generating both said trial parameters and said image processing parameter data in response to said customer satisfaction index data.

11. The method of claim 10, wherein said step of generating processing time data comprises:

generating polling data in response to said image size data, said host configuration data, and said data corresponding to a predefined sequence of image processing operations; and generating said processing time data in response to said polling data.

12. The method of claim 8, wherein said predetermined psychovisual attributes include sharpness, graininess, noise, luminance, color, tone and aspect ratio.

13. The method of claim 8, wherein the input image is represented by a multi-dimensional array of pixels, each pixel being associated with a corresponding point of the input image, the input image data comprising, for each said pixel, a digital data value defining an intensity of a corresponding point on the input image.

14. The method of claim 13 in which the digital data value for each said pixel further defines a color of said corresponding point on the input image.

* * * * *